United States Patent
Motohashi et al.

(10) Patent No.: US 11,024,914 B2
(45) Date of Patent: Jun. 1, 2021

(54) ASSEMBLED BATTERY

(71) Applicant: CALSONIC KANSEI CORPORATION, Saitama (JP)

(72) Inventors: Toshiyuki Motohashi, Saitama (JP); Hitoshi Ono, Saitama (JP); Yoshikazu Takamatsu, Saitama (JP); Takayuki Hirase, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 150 days.

(21) Appl. No.: 16/069,209

(22) PCT Filed: Dec. 19, 2016

(86) PCT No.: PCT/JP2016/087796
§ 371 (c)(1),
(2) Date: Jul. 11, 2018

(87) PCT Pub. No.: WO2017/126274
PCT Pub. Date: Jul. 27, 2017

(65) Prior Publication Data
US 2019/0006648 A1    Jan. 3, 2019

(30) Foreign Application Priority Data

Jan. 19, 2016   (JP) .............................. JP2016-008149

(51) Int. Cl.
*H01M 50/20* (2021.01)
*H01M 10/42* (2006.01)
*H01M 50/502* (2021.01)

(52) U.S. Cl.
CPC ......... *H01M 50/20* (2021.01); *H01M 10/425* (2013.01); *H01M 50/502* (2021.01)

(58) Field of Classification Search
CPC .. H01M 2/1072; H01M 2/1077; H01M 2/202; H01M 2/206; H01M 10/425
See application file for complete search history.

(56) References Cited

U.S. PATENT DOCUMENTS

| | | |
|---|---|---|
| 7,164,272 B1 | 1/2007 | Borrego Bel et al. |
| 2009/0110964 A1* | 4/2009 | Dobata ................. H01M 10/42 |
| | | 429/7 |
| 2009/0159347 A1* | 6/2009 | Zhou ..................... H01M 2/305 |
| | | 180/65.1 |
| 2010/0124693 A1* | 5/2010 | Kosugi .............. G01R 31/3644 |
| | | 429/92 |
| 2012/0156543 A1 | 6/2012 | Cicero et al. |
| 2012/0189873 A1 | 7/2012 | Park |
| 2013/0189549 A1* | 7/2013 | Nemoto ................. H01G 11/14 |
| | | 429/7 |

FOREIGN PATENT DOCUMENTS

| | | |
|---|---|---|
| JP | H11299115 A | 10/1999 |
| JP | 2013246941 A | 12/2013 |
| JP | 2014504440 A | 2/2014 |

OTHER PUBLICATIONS

Cell Monitoring Unit, Hella Electronics, date unknown, available online at https://www.hella.com/microsite-electronics/en/Cell-monitoring-unit-542.html.*
Jul. 24, 2018, International Preliminary Report on Patentability issued in the International Patent Application No. PCT/JP2016/087796.
Jan. 31, 2017, International Search Report issued in the International Patent Application No. PCT/JP2016/087796.
Aug. 27, 2019, Notification of Reasons for Refusal issued by the Japan Patent Office in the corresponding Japanese Patent Application No. 2016-008149 with English language concise explanation.
Jul. 10, 2020, Office Action issued by the China National Intellectual Property Administration in the corresponding Chinese Patent Application No. 201680079379.7 with English language concise explanation document.

* cited by examiner

*Primary Examiner* — Anca Eoff
(74) *Attorney, Agent, or Firm* — Kenja IP Law PC

(57) ABSTRACT

Productivity of an assembled battery is improved by shortening the takt time for assembly. An assembled battery (100) includes a battery module group (B) including one or more battery cells (150) and a cell holder (120) for holding the one or more battery cells (150), and an auxiliary module group (S) including components (210, 220, 230, 240) and a pedestal (200) on which the components (210, 220, 230, 240) are arranged. The battery module group (B) and the auxiliary module group (S) are attached together by the pedestal (200) being fastened to the cell holder (120) with bus bars (164, 165, 285, 286).

9 Claims, 17 Drawing Sheets

ASSEMBLED BATTERY

CROSS-REFERENCE TO RELATED APPLICATION

The present application claims priority to and the benefit of Japanese Patent Application No. 2016-008149 filed Jan. 19, 2016, the entire contents of which are incorporated herein by reference.

TECHNICAL FIELD

The present disclosure relates to an assembled battery.

BACKGROUND

An assembled battery in which a plurality of batteries is housed in a member such as a case is known. For example, patent literature (PTL) 1 discloses an assembled battery formed by disposing a plurality of lithium-ion cells in a frame member.

CITATION LIST

Patent Literature

PTL 1: JP2014-504440A

SUMMARY

Technical Problem

The assembled battery disclosed in PTL 1, however, is manufactured by first assembling a battery module group and then attaching other constituent elements to a terminal cover 800 on the surface of the battery module group. Therefore, the battery module group and the other constituent elements cannot be assembled in parallel, lengthening the takt time for assembly.

In light of these considerations, the present disclosure aims to provide an assembled battery that can improve productivity by shortening the takt time for assembly.

Solution to Problem

To resolve the aforementioned problem, an assembled battery according to a first aspect includes a battery module group including one or more battery cells and a cell holder configured to hold the one or more battery cells, and an auxiliary module group including a plurality of components and a pedestal on which the plurality of components is arranged. The battery module group and the auxiliary module group are attached together by the pedestal being fastened to the cell holder with bus bars.

In an assembled battery according to a second aspect, the battery module group and the auxiliary module group are preferably further attached together by an engaging claw of the pedestal engaging with an engaging hole of the cell holder.

In an assembled battery according to a third aspect, the pedestal is preferably fastened to the cell holder by connecting a bus bar attached to the pedestal to a bus bar attached to the cell holder.

In an assembled battery according to a forth aspect, the pedestal preferably further includes a support along the bus bar attached to the pedestal.

In an assembled battery according to a fifth aspect, bus bars fastening the pedestal to the cell holder are preferably attached at any opposing corners of the pedestal, and the pedestal and the cell holder are preferably further attached by bolts at different opposing corners from the any opposing corners.

Advantageous Effect

The assembled battery according to the first aspect achieves robust attachment without increasing the number of components.

The assembled battery according to the second aspect achieves more robust attachment without increasing the number of components.

The assembled battery according to the third aspect can reduce an increase in the number of components.

The assembled battery according to the forth aspect can prevent attachment between the auxiliary pedestal and the cell holder from weakening due to rotation of the bus bars. Furthermore, screwing of the bus bars is not blocked by rotation of the bus bars.

The assembled battery according to the fifth aspect allows attachment of the pedestal and the cell holder at four corners, making the attachment more robust.

DETAILED DESCRIPTION

Embodiments of the present disclosure are described below in detail with reference to the drawings.

Figure 1:
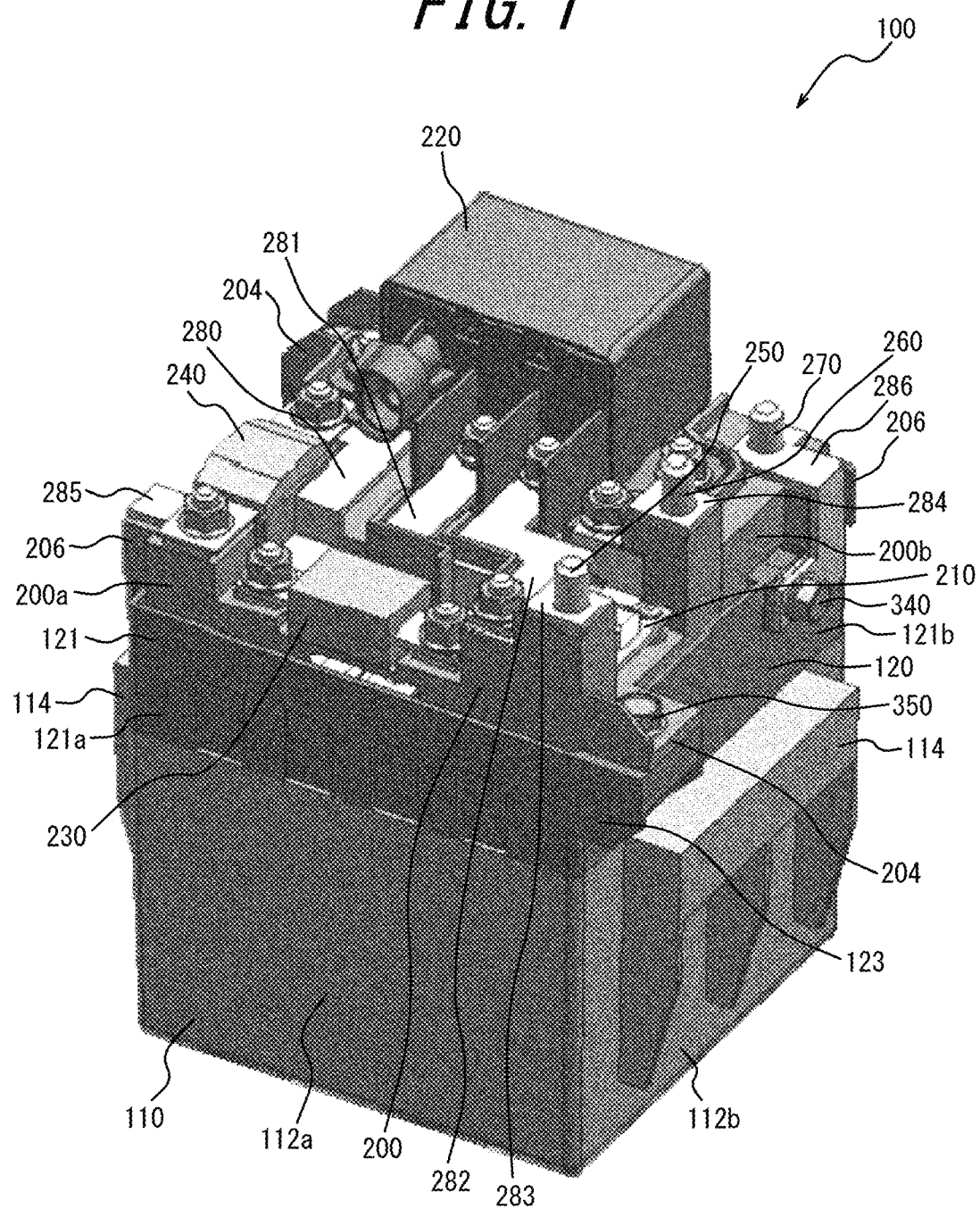
FIG. 1 is an external perspective view illustrating an assembled battery according to an embodiment of the present disclosure.

FIG. 1 is an external perspective view of an assembled battery according to an embodiment of the present disclosure, illustrating a state in which the upper case of the assembled battery is removed. In FIG. 1, however, the depiction of each component is partially simplified. Details of each component are provided in FIG. 5 through FIG. 15. The assembled battery 100 includes a lower case 110 housing battery cells, a cell holder 120 holding the battery cells housed in the lower case 110 at the side where an upper case is attached (top side), an auxiliary pedestal 200 attached to the top side of the cell holder 120, various components attached to the auxiliary pedestal 200, and an upper case, not illustrated in FIG. 1, for protecting the components. The auxiliary pedestal 200 corresponds to the pedestal of the present disclosure.

In the present embodiment, the assembled battery 100 includes a metal oxide semiconductor field effect transistor (MOSFET) 210, a relay 220, a current sensor 230, and a fusible link 240 as the components attached to the auxiliary pedestal 200. The assembled battery 100 includes three terminals that project to the outside of the upper case when the upper case is attached: an SSG terminal 250, a LOAD terminal 260, and a GND terminal 270.

In the present embodiment, the assembled battery 100 is described as being mounted and used in a vehicle, such as a vehicle that includes an internal combustion engine or a hybrid vehicle that can run on power of both an internal combustion engine and an electric motor, but the uses of the assembled battery 100 are not limited to vehicles.

Figure 2:
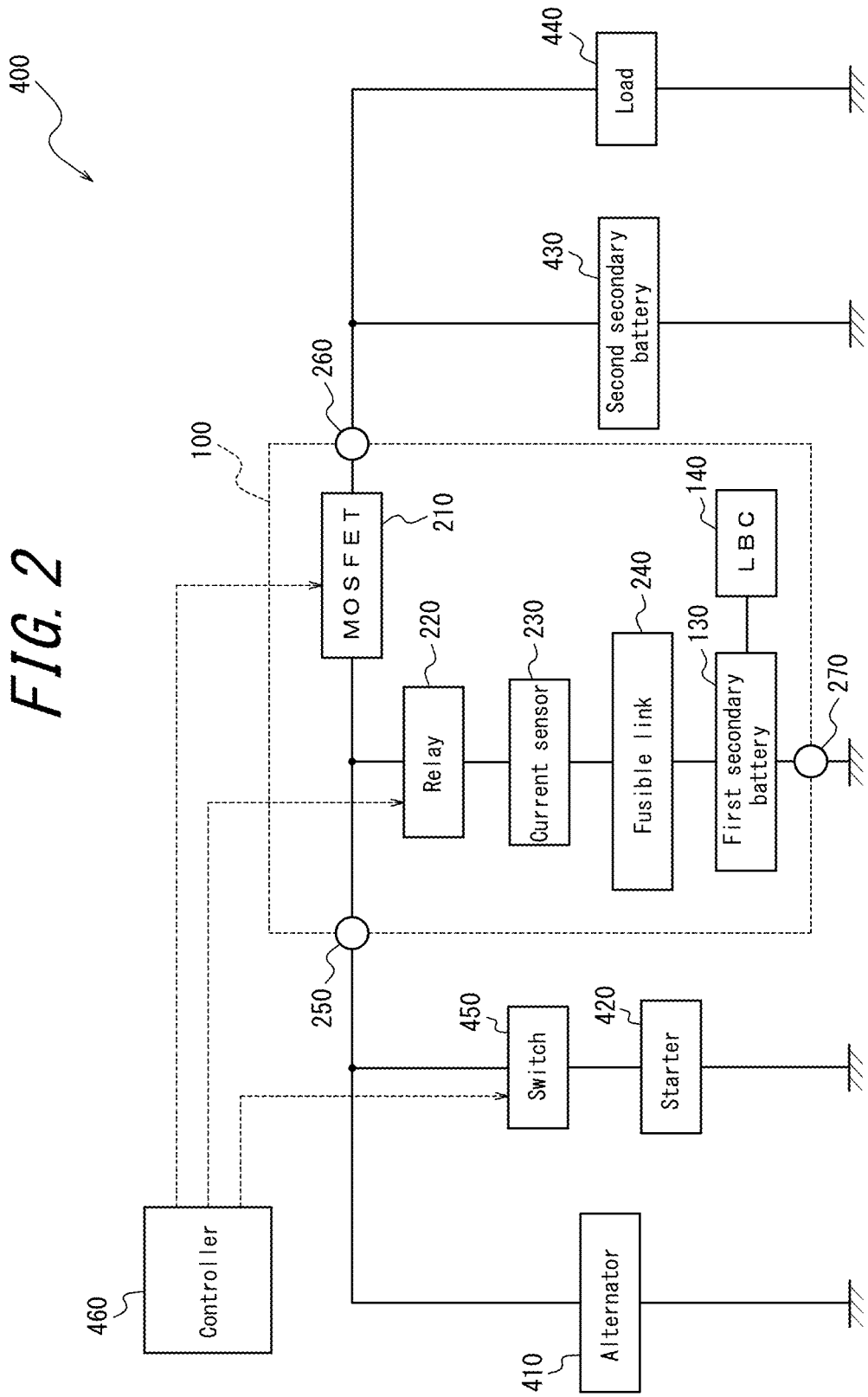
FIG. 2 is a functional block diagram illustrating an overview of a power supply system that includes the assembled battery illustrated in FIG. 1.

FIG. 2 is a functional block diagram illustrating an overview of a power supply system that includes the assembled battery 100 in FIG. 1. A power supply system 400 includes the assembled battery 100, an alternator 410, a starter 420, a second secondary battery 430, a load 440, a switch 450, and a controller 460. The assembled battery 100 includes a first secondary battery 130 housed in the lower case 110. The first secondary battery 130, the alternator 410, the starter 420, the second secondary battery 430, and the load 440 are connected in parallel.

The assembled battery 100 includes the MOSFET 210, the relay 220, the current sensor 230, the fusible link 240, the first secondary battery 130, and a battery controller (LBC) 140. The relay 220, the current sensor 230, the fusible link 240, and the first secondary battery 130 are connected in series in this order. The MOSFET 210 is connected in series with the second secondary battery 430 and the load 440.

The SSG terminal 250 is connected to the alternator 410 and the LOAD terminal 260 is connected to the load 440 in the assembled battery 100. The GND terminal 270 is used for grounding.

The relay 220 functions as a switch that connects the first secondary battery 130 in parallel with constituent elements outside of the assembled battery 100 in the power supply system 400 or disconnects the first secondary battery 130.

The current sensor 230 has an appropriate structure and uses an appropriate method to measure current flowing in a circuit that includes the first secondary battery 130.

The fusible link 240 is configured by a fuse body, a housing made of insulating resin for holding the fuse body, and a cover made of insulating resin for covering the housing. The fusible link 240 fuses when overcurrent occurs.

Figure 3:
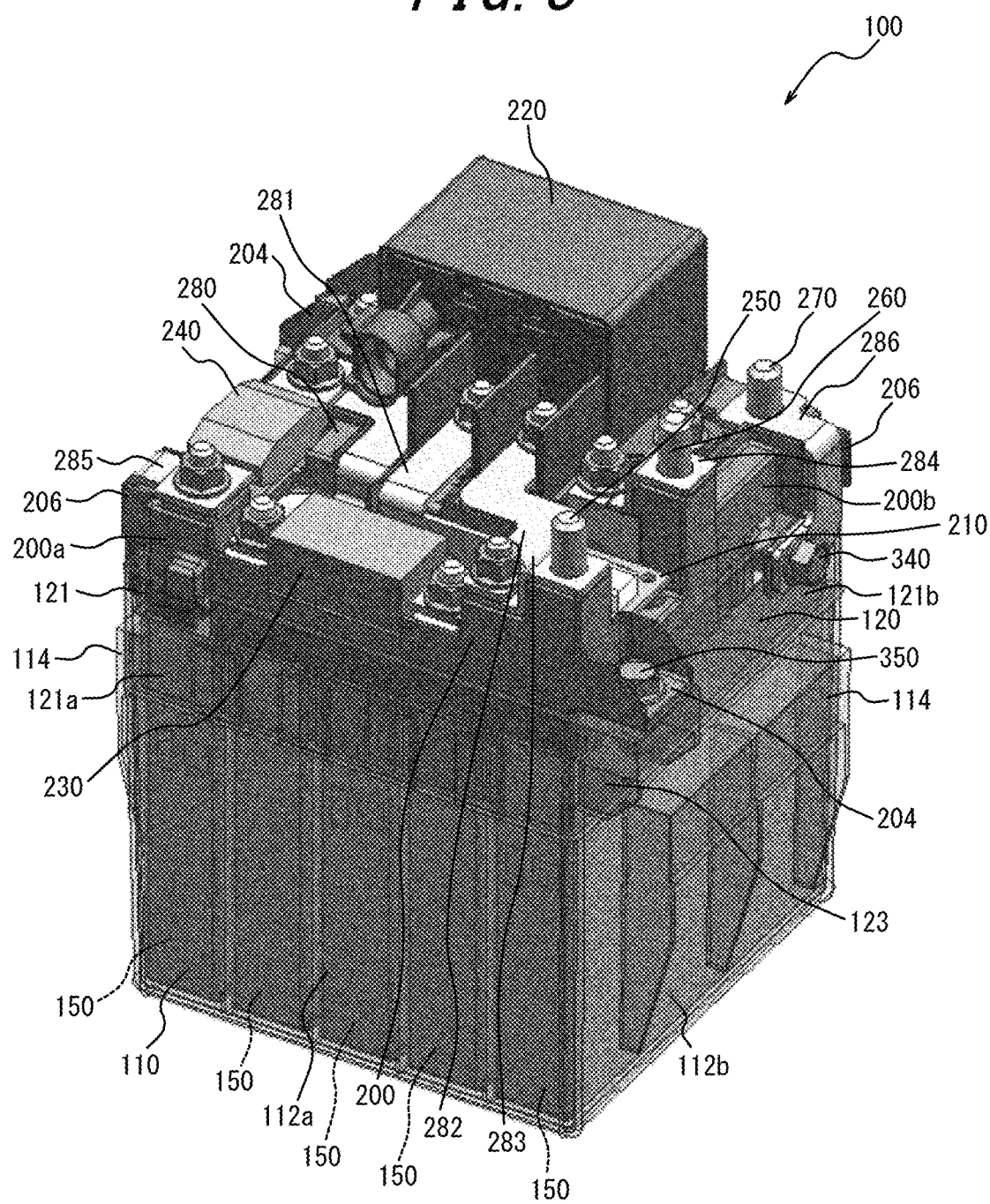
FIG. 3 is an external perspective view illustrating the assembled battery in FIG. 1 with the lower case and cell holder in a transparent state.

The first secondary battery 130 is constituted by an assembly of battery cells 150 housed in the lower case 110, as illustrated in FIG. 3, which illustrates the lower case 110 and the cell holder 120 in a transparent state. Each battery cell 150 in the first secondary battery 130 is, for example, a secondary battery such as a lithium-ion battery or a nickel-hydrogen battery. The first secondary battery 130 is connected to the fusible link 240 at the positive electrode side and is grounded via the GND terminal 270 at the negative electrode side.

The MOSFET 210 functions as a switch that connects the second secondary battery 430 and the load 440 in parallel with other constituent elements in the power supply system 400 or disconnects the second secondary battery 430 and the load 440.

The LBC 140 is connected to the first secondary battery 130 and estimates the state of the first secondary battery 130. For example, the LBC 140 estimates the state of charge (SOC) or the like of the first secondary battery 130.

The alternator 410 is an electrical generator and is connected mechanically to the vehicle's engine. The alternator 410 generates electricity by being driven by the engine. The output voltage of the electric power that the alternator 410 generates by being driven by the engine is adjusted by a regulator, and the electric power can be supplied to the first secondary battery 130 provided in the assembled battery 100, the second secondary battery 430, and the load 440. The alternator 410 can also generate electricity by regeneration, for example when the vehicle slows down. The electric power that the alternator 410 generates by regeneration is used to charge the first secondary battery 130 and the second secondary battery 430.

The starter 420 is, for example, configured to include a cell motor, receives a power supply from at least one of the first secondary battery 130 and the second secondary battery 430, and starts the engine of the vehicle.

The second secondary battery 430 is constituted by a lead storage battery, for example, and supplies electric power to the load 440.

The load 440 includes, for example, the audio, air-conditioner, navigation system, and the like provided in the vehicle. The load 440 operates by consuming the supplied electric power. The load 440 operates by receiving the electric power supplied from the first secondary battery 130 while driving of the engine is suspended and operates by receiving the electric power supplied from the alternator 410 and the second secondary battery 430 during driving of the engine.

The switch 450 is connected in series to the starter 420. The switch 450 connects the starter 420 in parallel with other constituent elements or disconnects the starter 420.

The controller 460 controls overall operations of the power supply system 400. The controller 460 is, for example, constituted by the electric control unit or engine control unit (ECU) of the vehicle. The controller 460 controls operations of the switch 450, the MOSFET 210, and the relay 220, supplies power with the alternator 410, the first secondary battery 130, and the second secondary battery 430, and charges the first secondary battery 130 and the second secondary battery 430.

Next, the detailed structure of the assembled battery 100 is described with reference to FIG. 4 through FIG. 17. FIG.

Figure 4:
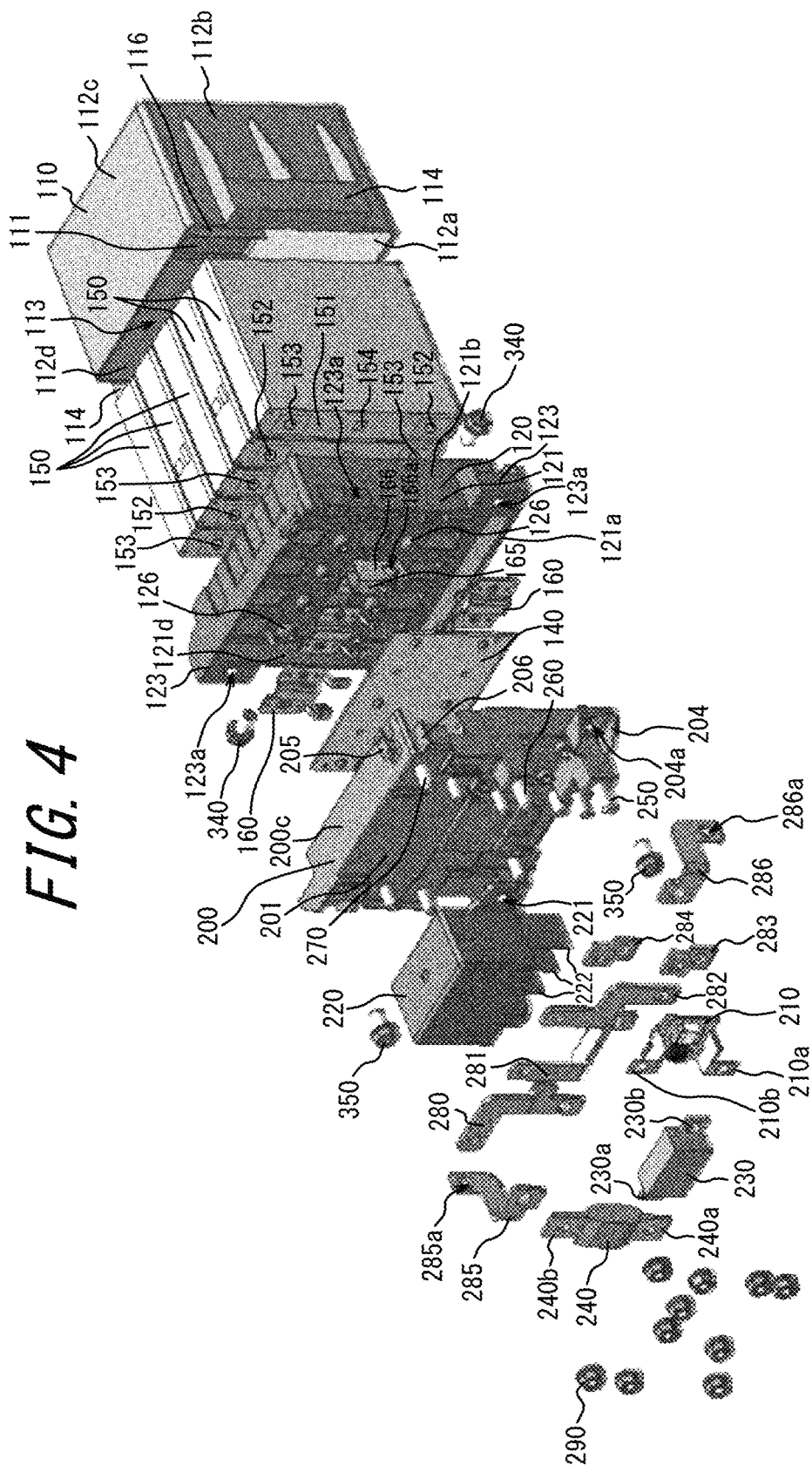
FIG. 4 is an exploded perspective view of the assembled battery in FIG. 1.
Figure 5:
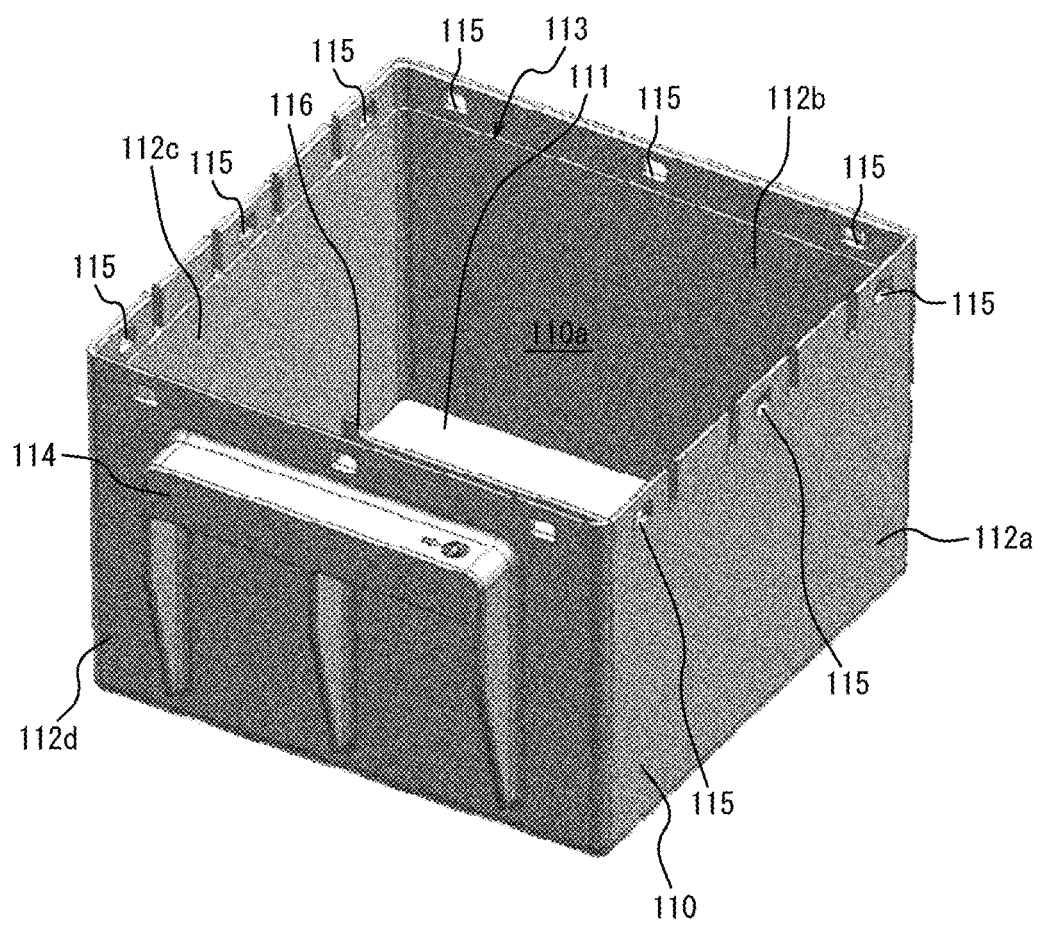
FIG. 5 is an external perspective view of the lower case in FIG. 1.
Figure 6:
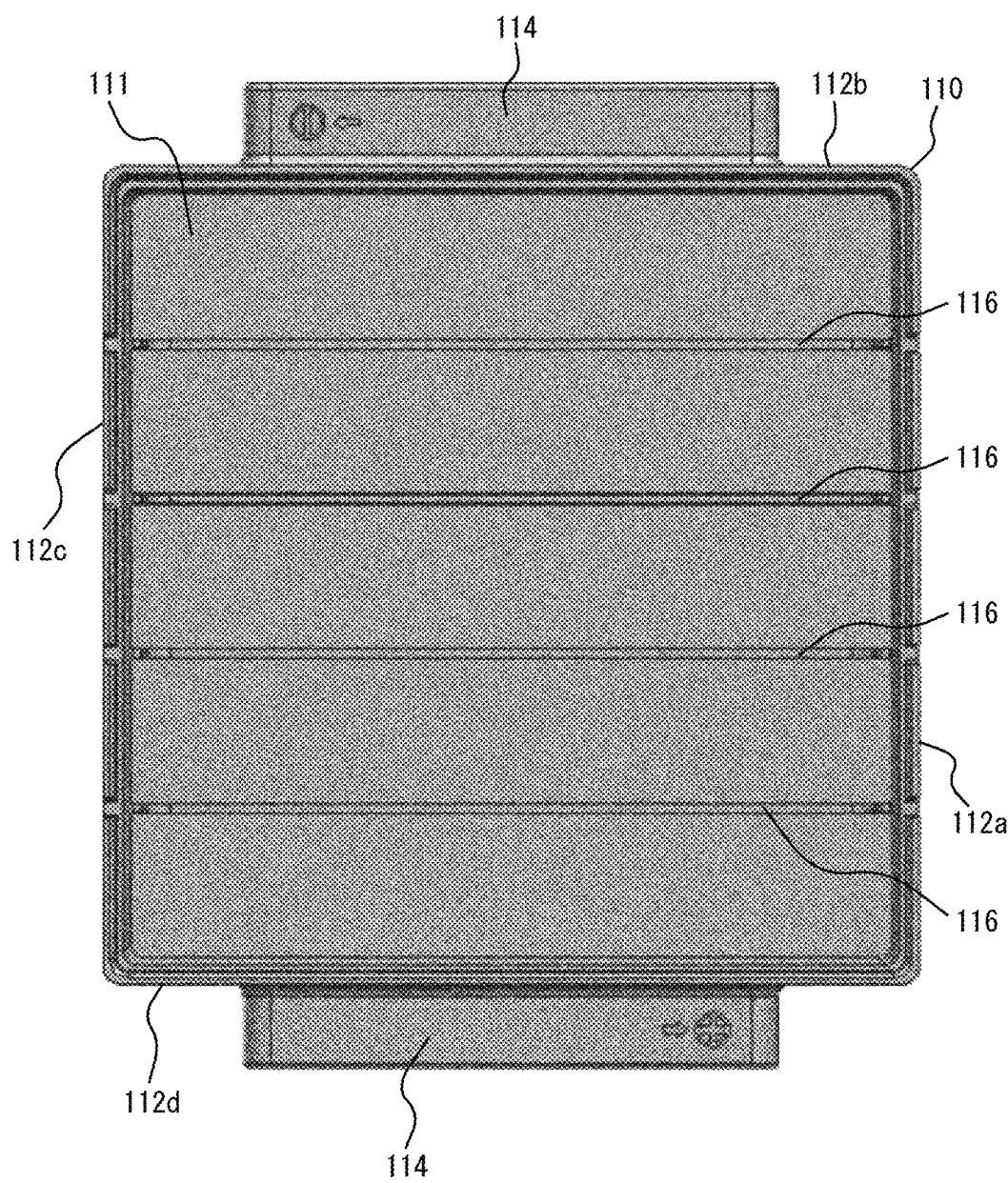
FIG. 6 is a top view of the lower case in FIG. 5.
Figure 7A:
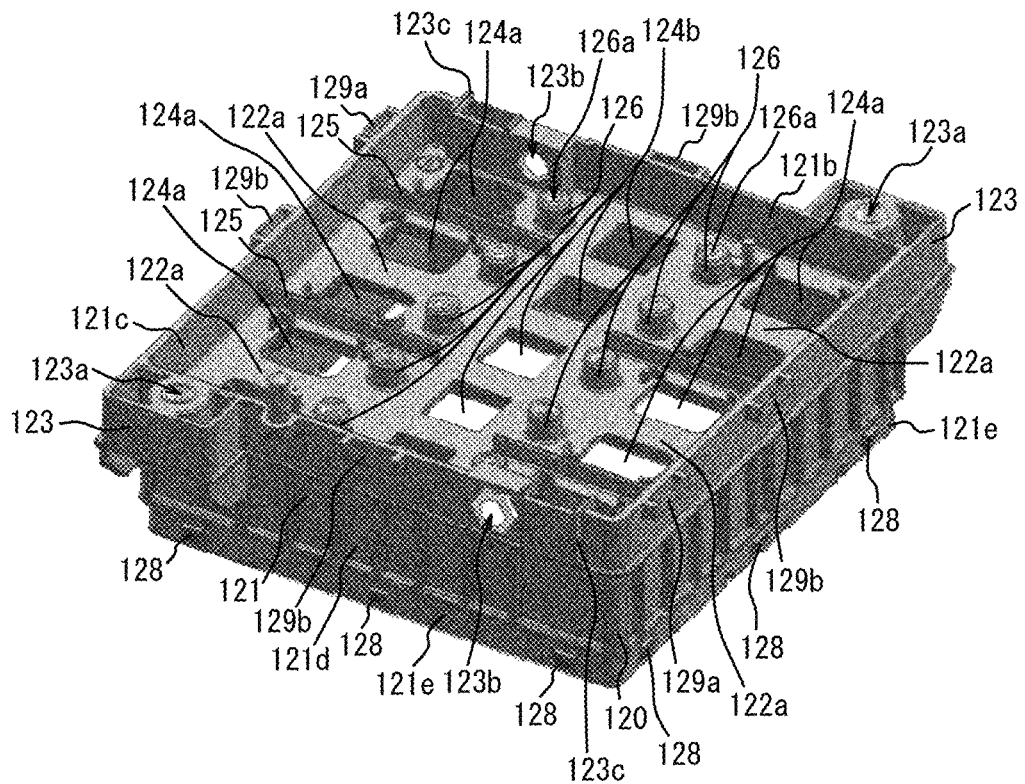
FIG. 7A and FIG. 7B are external perspective views of the cell holder in FIG. 1.
Figure 7B:
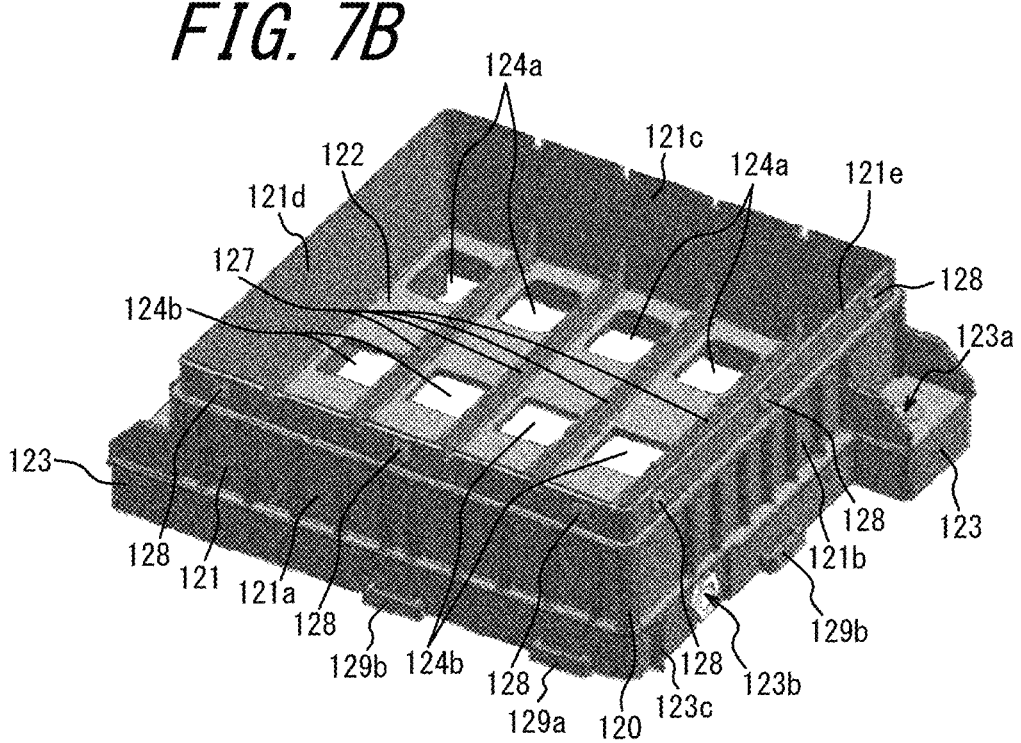
Figure 8:
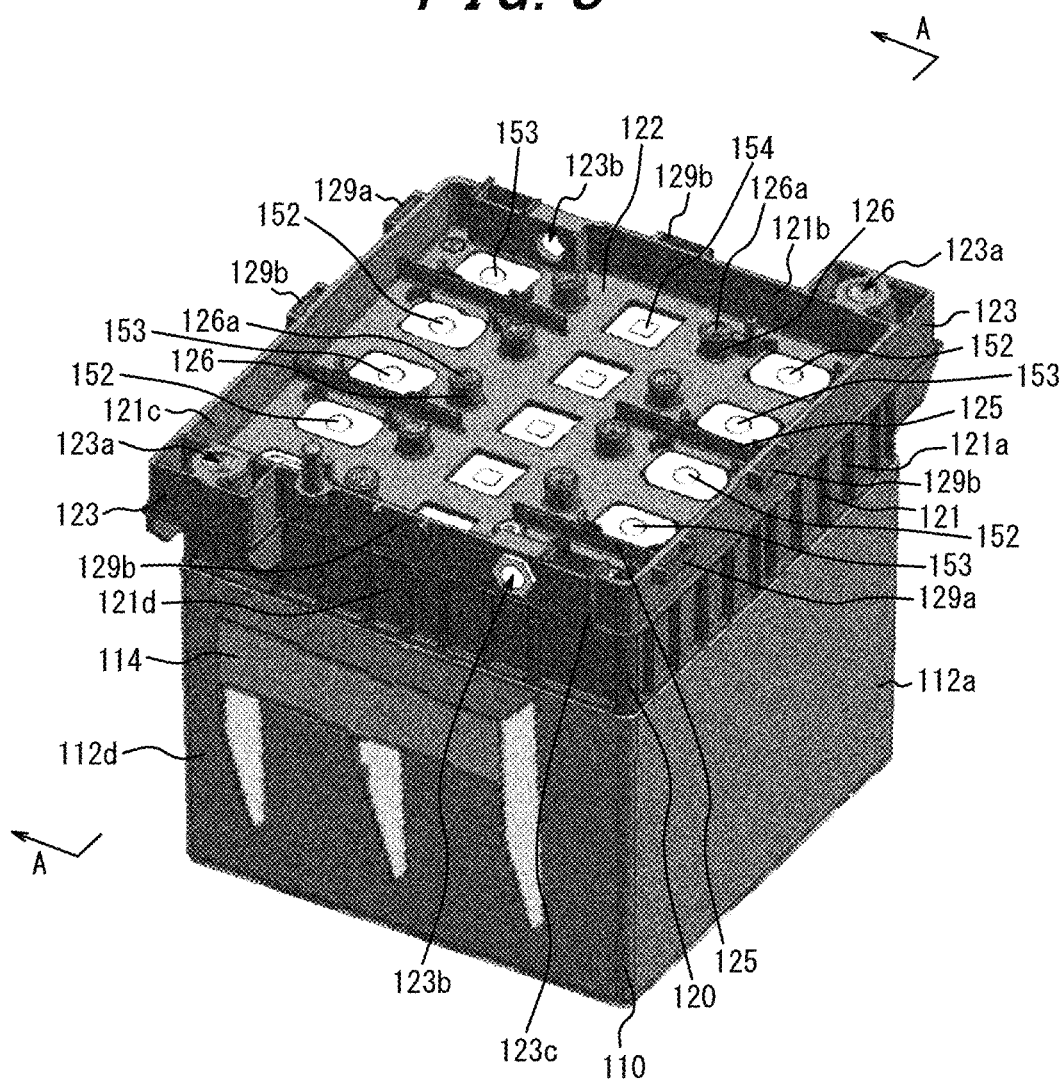
FIG. 8 is an external perspective view illustrating the cell holder in FIGS. 7A and 7B attached to the lower case in FIG. 5.
Figure 9:
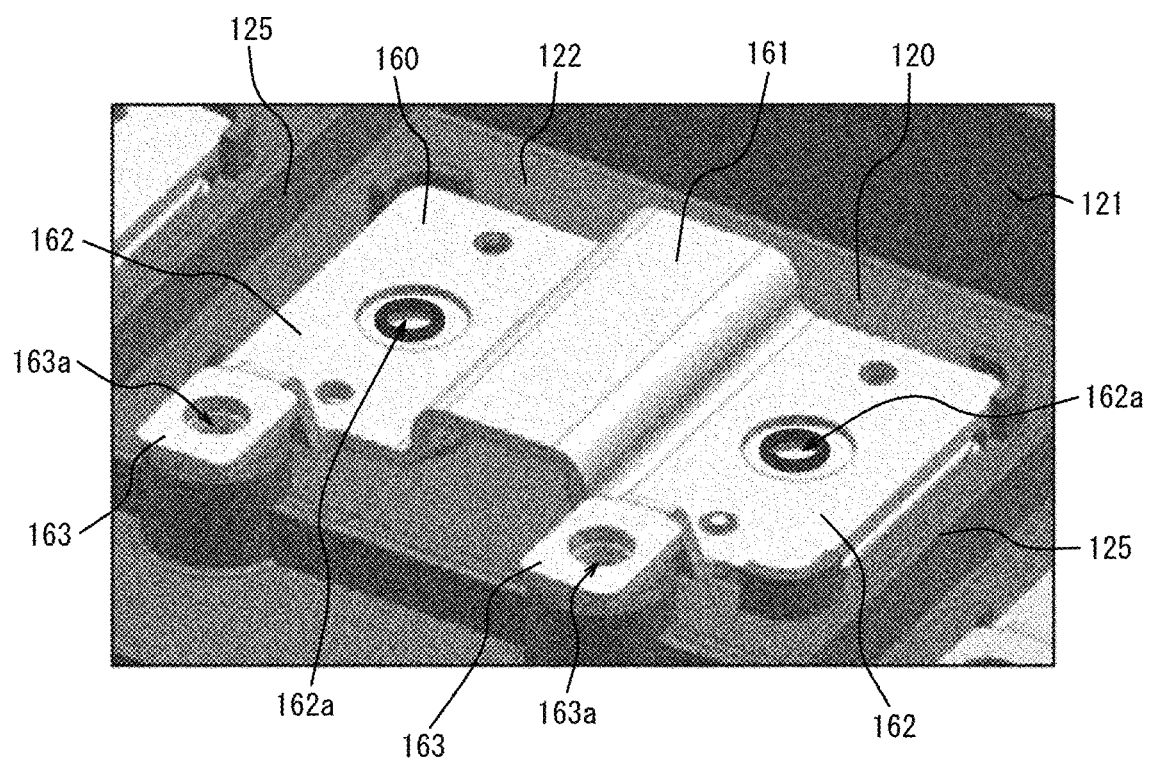
FIG. 9 is an expanded external perspective view of an inter-cell bus bar attached to the cell holder.
Figure 10:
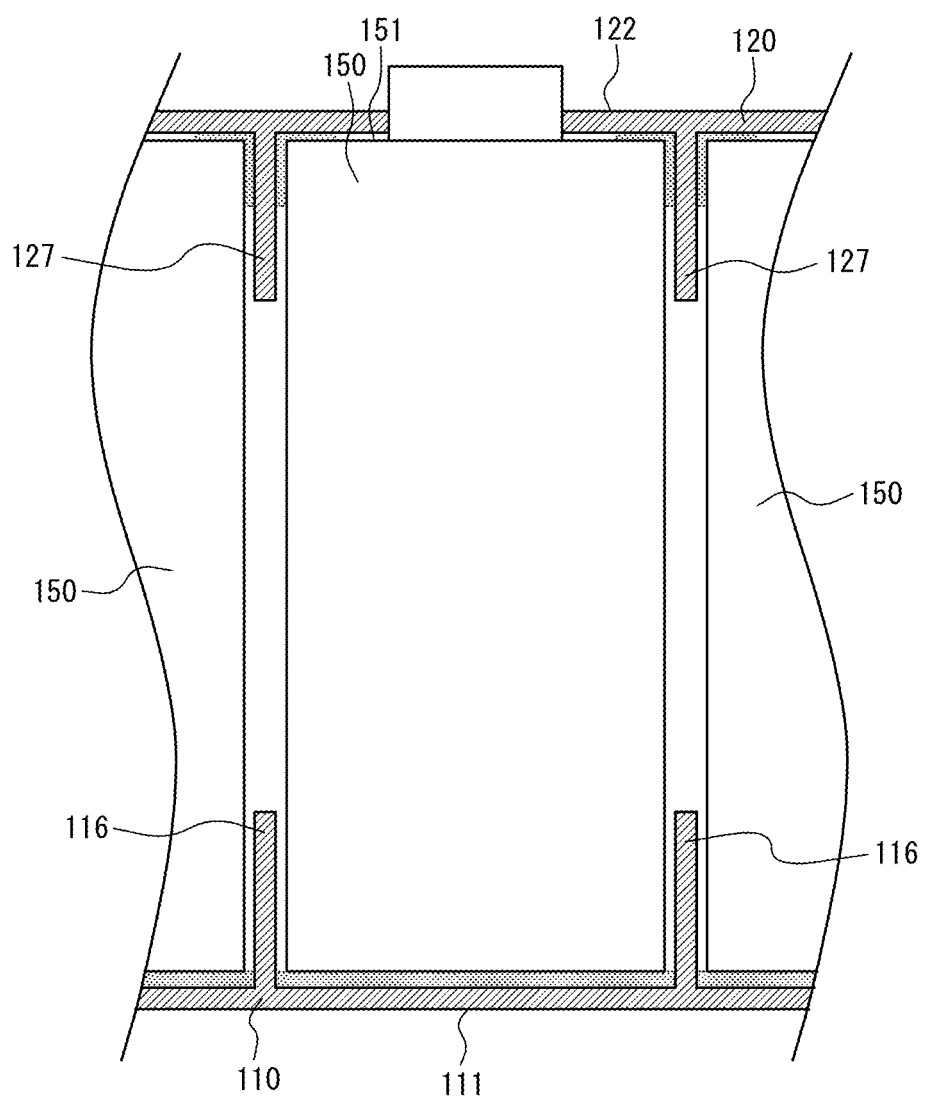
FIG. 10 schematically illustrates the adhesion positions of the battery cell to the lower case and the cell holder in the assembled battery of FIG. 1.
Figure 11A:
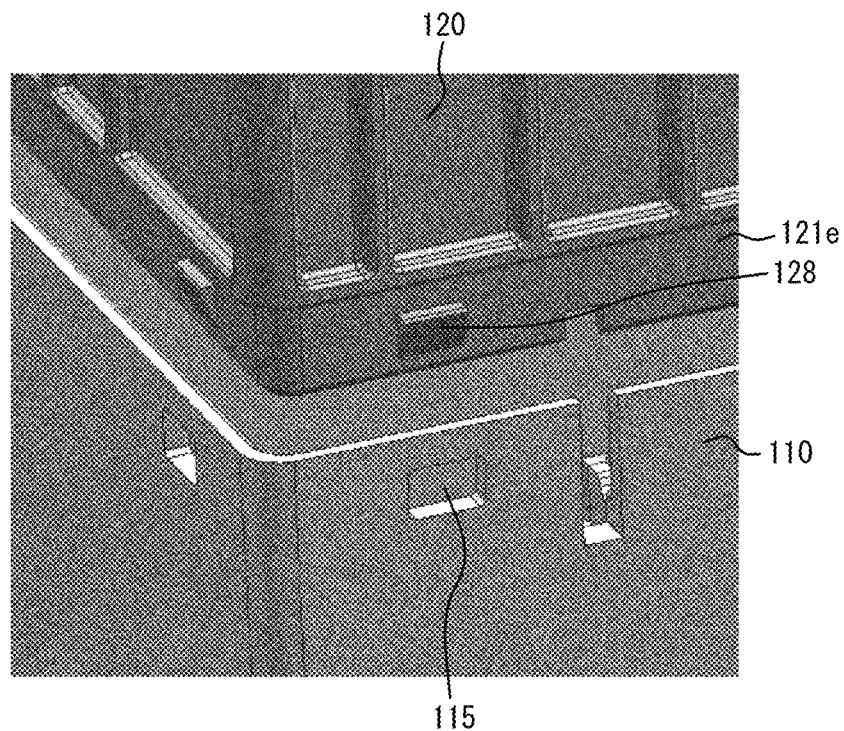
FIG. 11A and FIG. 11B schematically illustrate the state before and after engagement between an engaging claw of the cell holder and an engaging hole of the lower case.
Figure 11B:
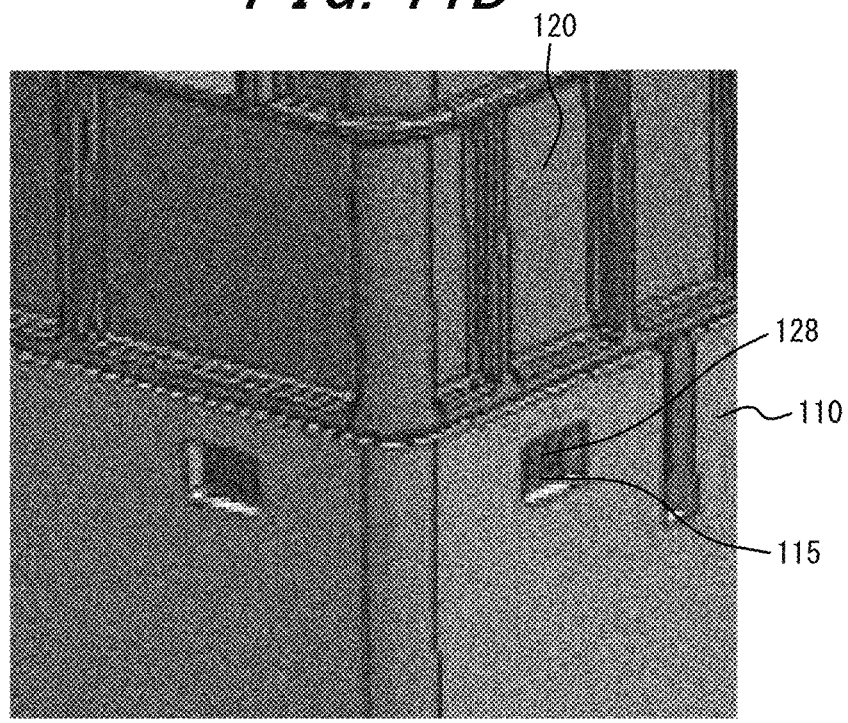
Figure 12:
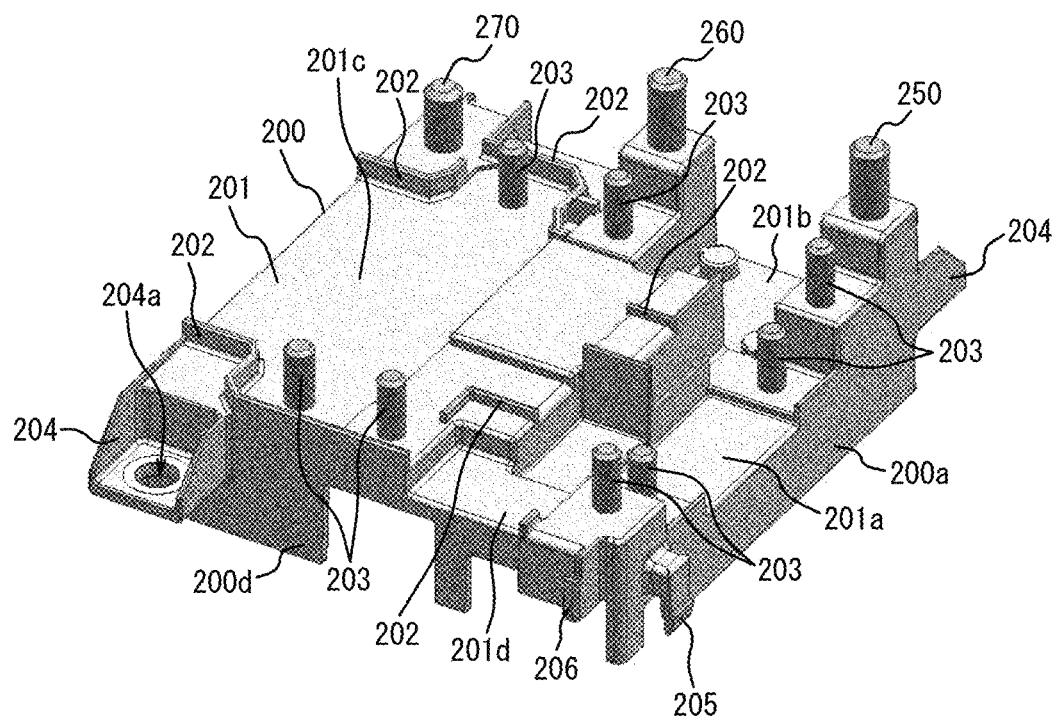
FIG. 12 is an external perspective view of the auxiliary pedestal in FIG. 1.
Figure 13A:
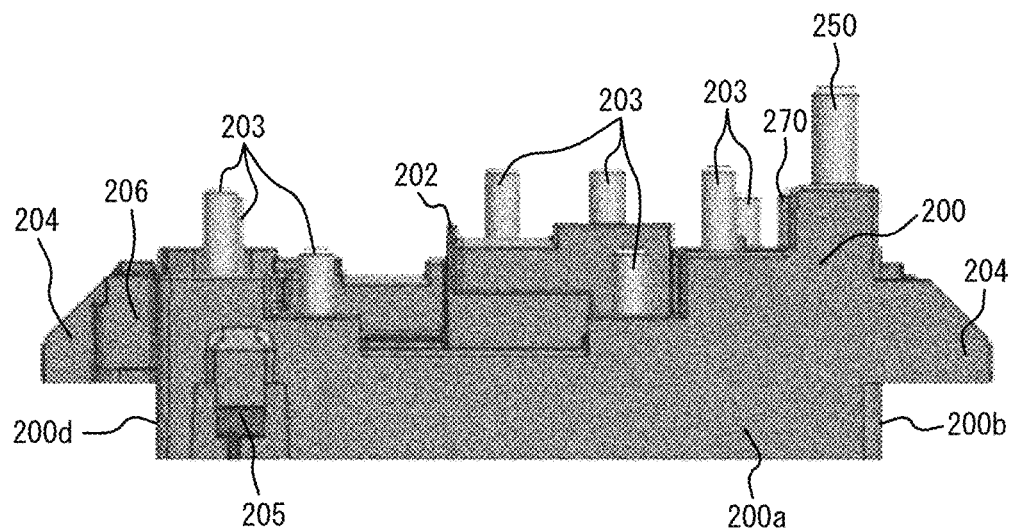
FIG. 13A and FIG. 13B are side views of the auxiliary pedestal in FIG. 1 from one side.
Figure 13B:
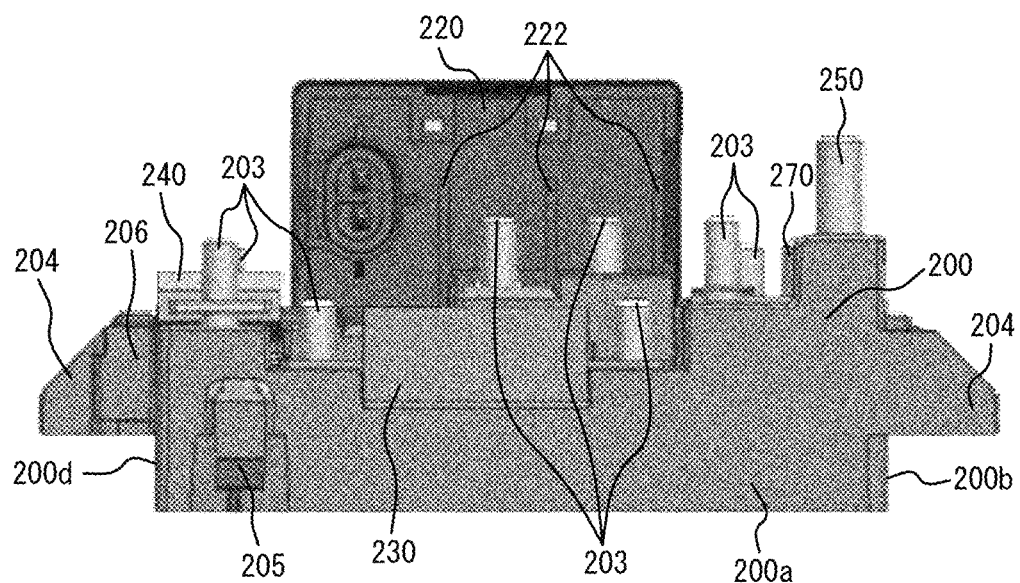
Figure 14:
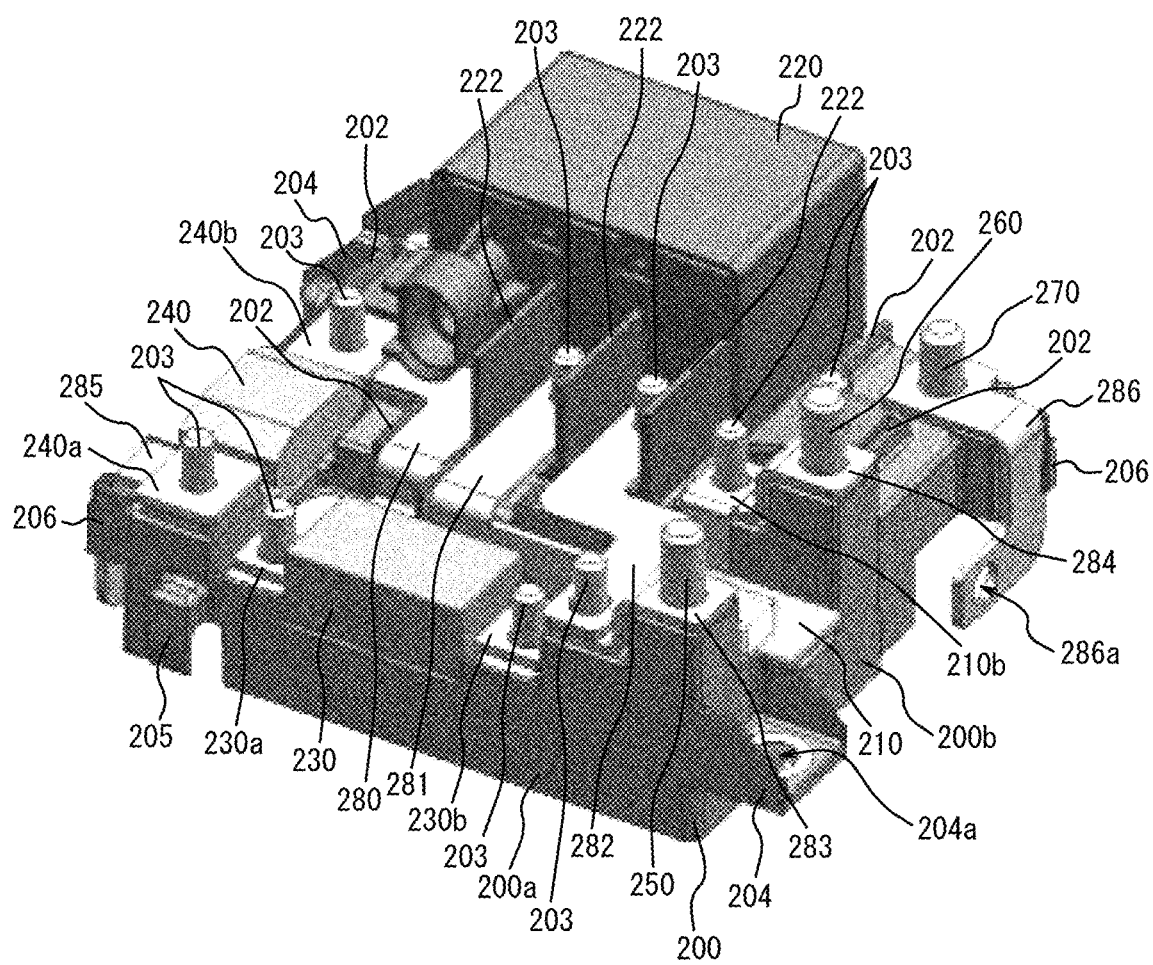
FIG. 14 is an external perspective view of the auxiliary pedestal illustrating a state in which the components and bus bars are attached.
Figure 15:
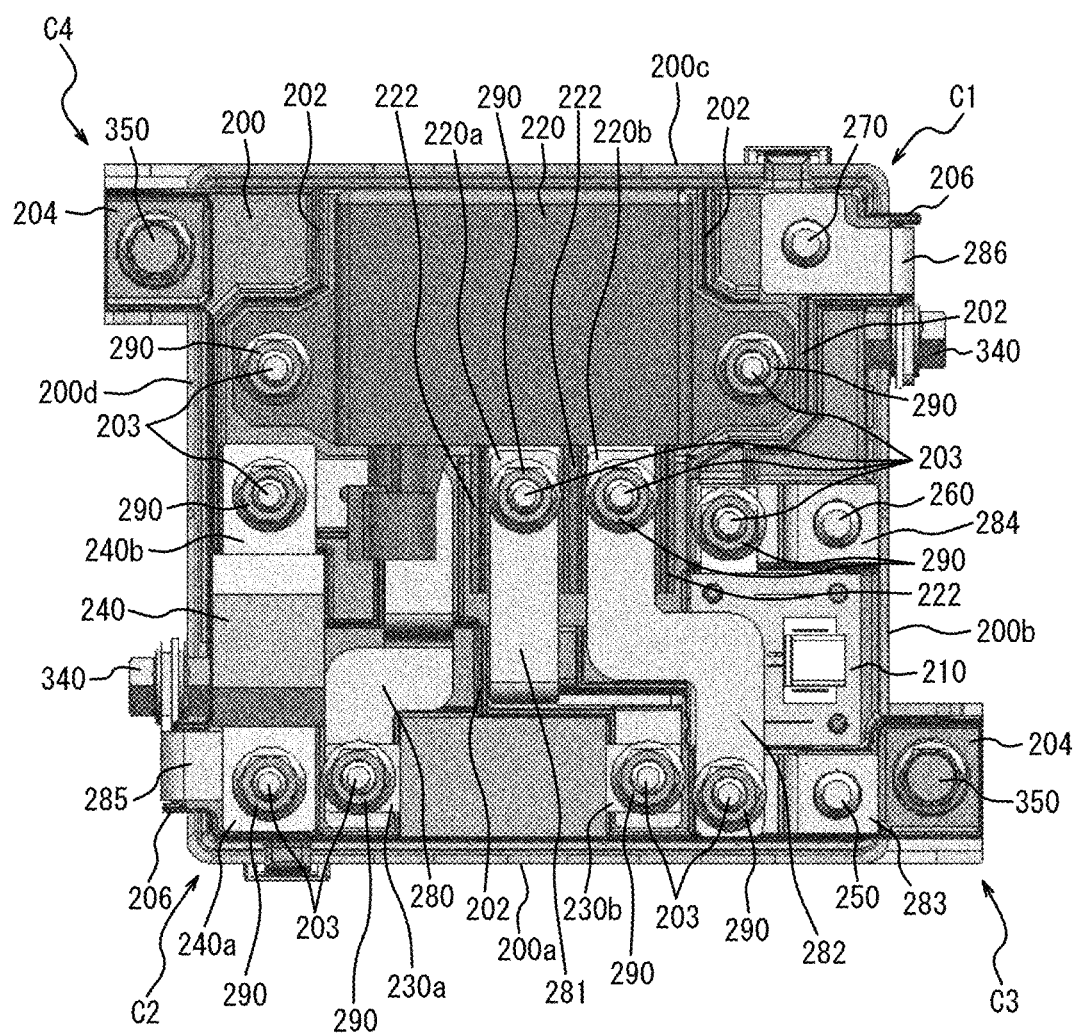
FIG. 15 is a top view of the auxiliary pedestal illustrating a state in which the components and bus bars are fixed with nuts.
Figure 16:
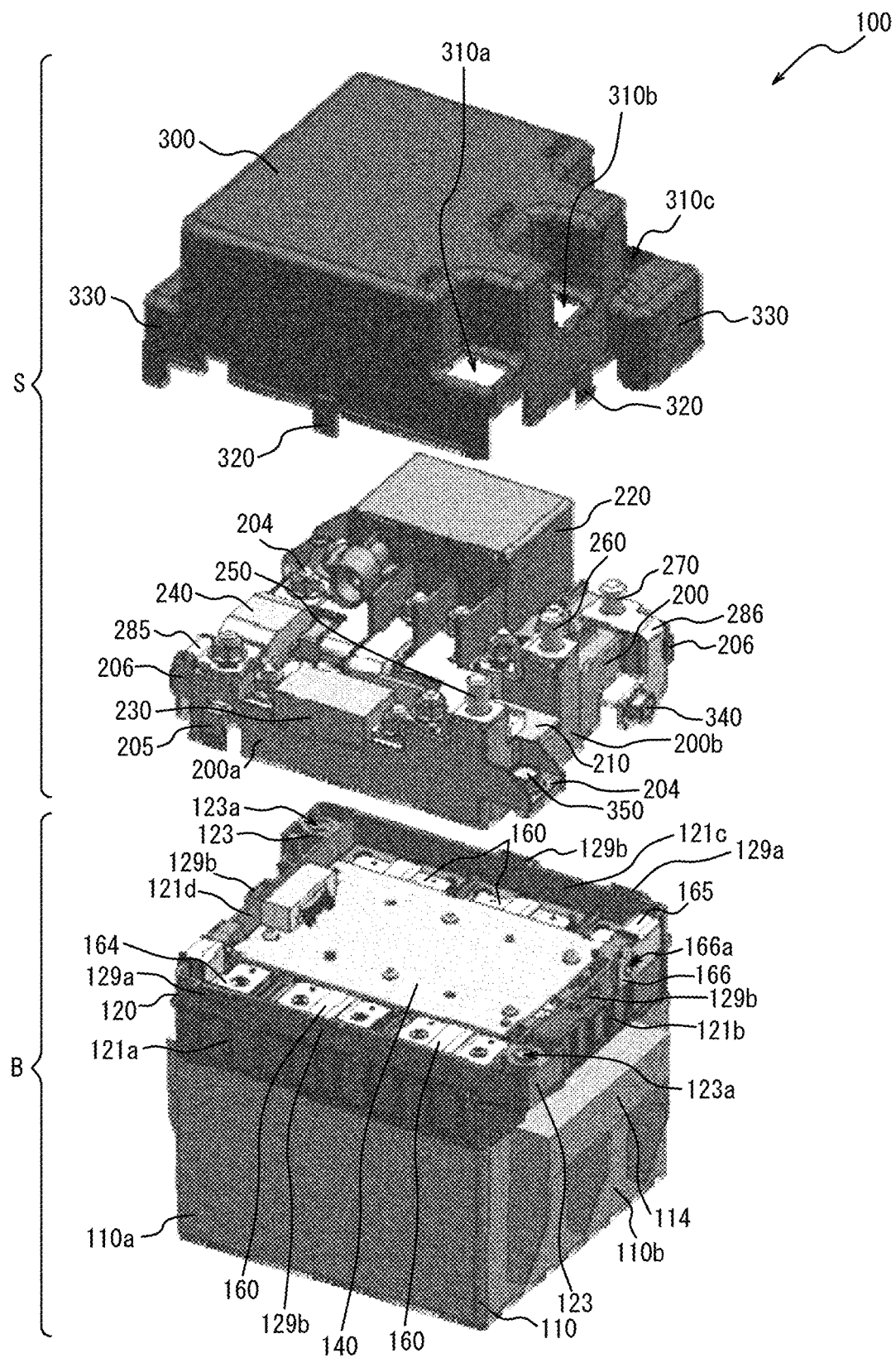
FIG. 16 illustrates assembly of the entire assembled battery.
Figure 17:
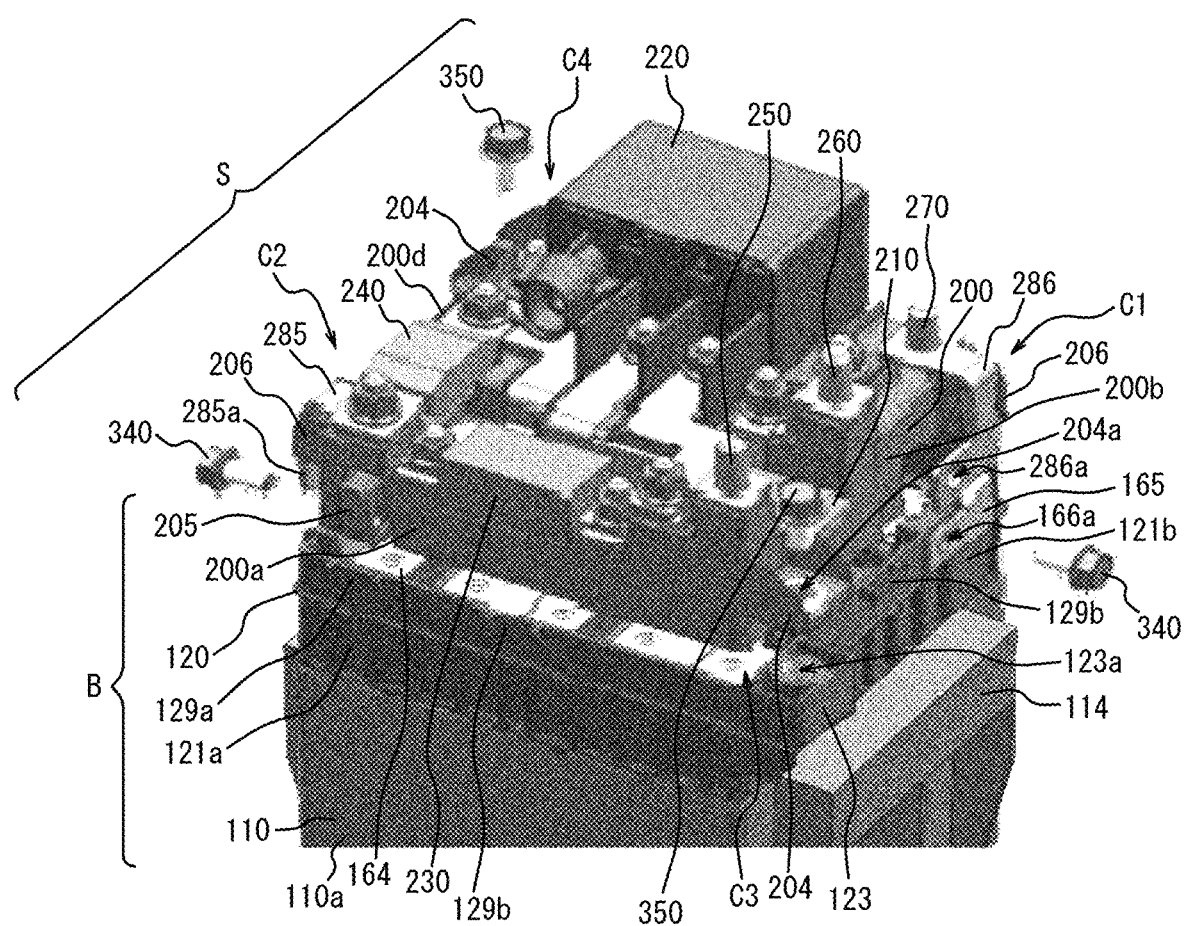
FIG. 17 illustrates attachment of a battery module group and an auxiliary module group.

4 is an exploded perspective view of the assembled battery in FIG. 1. In FIG. 4, however, the depiction of each component is partially simplified, as in FIG. 1. FIG. 5 is an external perspective view of the lower case 110, and FIG. 6 is a top view of the lower case 110. FIG. 7A and FIG. 7B are external perspective views of the cell holder 120. FIG. 7A is an external perspective view of the cell holder 120 from the top side, and FIG. 7B is an external perspective view of the cell holder 120 from the opposite side from the top side (bottom side). FIG. 8 is an external perspective view illustrating the cell holder 120 attached to the lower case 110. FIG. 9 is an expanded external perspective view of an inter-cell bus bar 160 attached to the cell holder 120. FIG. 10 schematically illustrates the adhesion positions of the battery cell 150 to the lower case 110 and the cell holder 120 in the assembled battery 100. FIG. 11A and FIG. 11B schematically illustrate the state before and after engagement between an engaging claw 128 of the cell holder 120 and an engaging hole 115 of the lower case 110. FIG. 12 is an external perspective view of the auxiliary pedestal 200, and FIG. 13A and FIG. 13B are side views of the auxiliary pedestal 200 from one side. FIG. 13A is a side view of only the auxiliary pedestal 200, and FIG. 13B is a side view of a state in which components such as the relay 220 are mounted on the auxiliary pedestal 200. FIG. 14 is an external perspective view of the auxiliary pedestal 200 illustrating a state in which the components and bus bars are attached. FIG. 15 is a top view of the auxiliary pedestal 200 illustrating a state in which the components and bus bars are fixed with nuts 290. As illustrated in FIG. 15, the auxiliary pedestal 200 has corners C1 through C4. FIG. 16 illustrates assembly of the entire assembled battery, and FIG. 17 illustrates attachment of a battery module group B and an auxiliary module group S.

The assembled battery 100 according to the present embodiment is assembled by assembling the battery module group B and the auxiliary module group S and subsequently attaching the battery module group B and auxiliary module group S together and fixing the upper case. The assembly and the attachment are performed by an assembly apparatus. The battery module group B and the auxiliary module group S are assembled separately and therefore can be assembled in parallel, allowing the assembly takt time to be shortened and improving productivity of the assembled battery 100. Furthermore, the battery module group B and the auxiliary module group S are attached together after being assembled separately. Hence, as compared to when the entire assembled battery 100 is assembled in sequence, components are discarded less frequently due to backtracking when problems occur during attachment.

The battery module group B is constituted by attaching together the battery cells 150, the lower case 110 housing the battery cells 150, the cell holder 120 holding the battery cells 150, the inter-cell bus bars 160, a total plus terminal bus bar 164, a total minus terminal bus bar 165, and the LBC 140.

In the present embodiment, the battery cells 150 provided in the assembled battery 100 have a substantially cuboid shape. The assembled battery 100 of the present embodiment houses five battery cells 150, but the total number of battery cells 150 that the assembled battery 100 can house is not limited to five. The total number of battery cells 150 that the assembled battery 100 can house is appropriately determined in accordance with factors such as the maximum output of the battery cells 150 and the electric power consumed by driven devices of the vehicle or the like.

As illustrated in FIG. 5, the lower case 110 is a case that includes a space 110a capable of housing the battery cells 150 from the top side. In other words, the lower case 110 has a bottom 111, four sides 112a, 112b, 112c, and 112d, and an opening 113 on the opposite side from the bottom 111 (i.e. on the top side). In the lower case 110, the sides 112a and 112c face each other, and the sides 112b and 112d face each other. When not differentiating between the four sides 112a, 112b, 112c, and 112d, these sides are collectively referred to below as the sides 112. The height of the sides 112 is less than the height of the battery cells 150 housed in the lower case 110.

The sides 112b and 112d each include an attachment mechanism 114 for attaching the assembled battery 100 to a vehicle on the outside of the lower case 110 (i.e. on the opposite side from the space 110a). The shape of the attachment mechanism 114 and the position on the sides 112b and 112d are determined appropriately in accordance with the method of attachment to the vehicle.

The sides 112 have engaging holes 115 for engagement with the cell holder 120 on the opening 113 side. In the present embodiment, each side 112 has three engaging holes 115, located at the center and near the edges of the opening 113.

The bottom 111 includes guides 116, on the inside of the lower case 110 (i.e. the space 110a side), to indicate the position of the battery cells 150 to be housed and to prevent misalignment of the housed battery cells 150. The guides 116 also have the function of maintaining a space between battery cells 150. An insulating sheet, for example, may be inserted in the space between battery cells 150 formed by the guides 116.

The height of the guides 116 is less than the height of the sides 112. In the present embodiment, four guides 116 are provided parallel to the sides 112b and 112d at equal intervals. In other words, the lower case 110 in the present embodiment houses five battery cells 150 disposed to be stacked from the side 112b to the side 112d along five regions of the bottom 111 partitioned by the guides 116.

In general, when manufacturing the lower case 110, dimensional error is less likely to occur in the sides 112a and 112c, which do not include the attachment mechanism 114, than in the sides 112b and 112d, which do include the attachment mechanism 114. Therefore, by disposing the battery cells 150 to be stacked along the direction of the sides 112a and 112c, as in the present embodiment, the battery cells 150 housed in the lower case 110 are less likely to shift within the lower case 110 in the stacking direction.

The position, size, and the like of the guides 116 are appropriately determined in accordance with the shape, number, and the like of the battery cells 150 housed by the lower case 110.

The battery cell 150 includes a positive electrode terminal 152 and a negative electrode terminal 153 on one substantially cuboid cap surface 151. The cap surface 151 is rectangular, with long sides and short sides, and the positive electrode terminal 152 and the negative electrode terminal 153 are provided near the edges in the direction of the long sides of the cap surface 151. A safety valve 154 is provided at the center of the cap surface 151. The safety valve 154 opens to discharge gas to the outside when, due to deterioration over time, thermal runaway, or the like, gas is produced inside the battery cell 150 and the inside of the battery cell 150 reaches a predetermined pressure or greater. The battery cell 150 is housed in the lower case 110 so that the cap surface 151 projects from the opening 113, i.e. to become the top side. As illustrated in FIG. 4, the battery cells 150 are housed within the lower case 110 so that the positive electrode terminal 152 and the negative electrode terminal 153 of adjacent battery cells 150 are arranged in opposite directions in the lower case 110.

The cell holder 120 is attached at the cap surface 151 side of the battery cell 150, i.e. at the opening 113 side of the lower case 110.

The cell holder 120 includes an outer frame 121 and a holding lid 122 on the inside of the outer frame 121. The outer frame 121 is substantially rectangular in a top view and has a predetermined height. The holding lid 122 holds the battery cells 150 from the top side when the cell holder 120 is engaged with the lower case 110. The holding lid 122 holds the cap surface 151 of the battery cells 150, housed in the lower case 110, from the top side.

As illustrated in FIG. 8, the outer frame 121 has four sides 121a, 121b, 121c, and 121d. The four sides 121a, 121b, 121c, and 121d are disposed at positions corresponding to the four sides 112a, 112b, 112c, and 112d of the lower case 110 when the outer frame 121 and the lower case 110 are engaged.

The outer frame 121 includes screw hole forming portions 123, at the edges of the sides 121b and 121d, that have a screw hole 123a for fixing the auxiliary pedestal 200 to the cell holder 120 by screwing. The screw hole forming portions 123 are formed to project outward from the sides 121b and 121d. The screw hole 123a is formed in the screw hole forming portion 123 to allow insertion of a screw from the top side.

The outer frame 121 has screw holes 123b, at the top side of the sides 121b and 121d, for screwing bus bars attached to the auxiliary pedestal 200 (i.e. the below-described total plus copper bus bar 285 and total minus copper bus bar 286) to the cell holder 120. The screw holes 123b are preferably provided near the opening 124a (illustrated in FIG. 7A) where the below-described total plus terminal bus bar 164 and total minus terminal bus bar 165 are attached.

The holding lid 122 has openings 124a at positions corresponding to the positive electrode terminal 152 and negative electrode terminal 153 of the battery cells 150 when the cell holder 120 and the lower case 110 are engaged. In other words, as illustrated in FIG. 8, the positive electrode terminal 152 and negative electrode terminal 153 of the battery cells 150 are exposed to the top side of the holding lid 122 through the openings 124a when the cell holder 120 and the lower case 110 are engaged.

The holding lid 122 has openings 124b at positions corresponding to the safety valves 154 of the battery cells 150 when the cell holder 120 and the lower case 110 are engaged. In other words, as illustrated in FIG. 8, gas discharged from the safety valves 154 is discharged outside the battery cells 150 through the openings 124b when the cell holder 120 and the lower case 110 are engaged.

Adjacent terminals among the positive electrode terminals 152 and negative electrode terminals 153, which are exposed through the openings 124a and arranged in a line, electrically connect through inter-cell bus bars 160, except for a positive electrode terminal 152 that connects to the fusible link 240 and a negative electrode terminal 153 that connects to the GND terminal 270. The inter-cell bus bar 160 is, for example, made of a conductive metal such as aluminum. The inter-cell bus bar 160 has a convex portion 161 for avoiding interference with a frame portion 122a of the holding lid 122 between openings 124a when the inter-cell bus bar 160 is attached to the cell holder 120 and connected to the positive electrode terminal 152 and the negative electrode terminal 153. In other words, in a side view, the inter-cell bus bar 160 has two terminal connectors 162 connecting to the positive electrode terminal 152 and the negative electrode terminal 153 and has the convex portion 161 connecting the two terminal connectors 162 and projecting from the terminal connectors 162 toward the top side.

The terminal connectors 162 have openings for welding 162a at the center, for example as illustrated in FIG. 9. The inter-cell bus bars 160 and the below-described total plus terminal bus bar 164 and total minus terminal bus bar 165 are connected to the terminals of the battery cells 150 by bead welding at the periphery of the openings for welding 162a.

Each terminal connector 162 has a voltage sensor attachment terminal 163 that projects towards the opening 124b when the terminal connector 162 is attached to the cell holder 120. Each voltage sensor attachment terminal 163 has a screw hole 163a. In the inter-cell bus bar 160, each voltage sensor attachment terminal 163 is formed to be disposed on the below-described screw hole forming portion 126 when the terminal connector 162 of the inter-cell bus bar 160 is connected to the positive electrode terminal 152 or the negative electrode terminal 153. The screw hole 163a overlaps with a screw hole 126a formed in the screw hole forming portion 126 when the voltage sensor attachment terminal 163 is disposed on the screw hole forming portion 126, and by screwing of the LBC 140, the screw hole 126a and the screw hole 163a are screwed together. The voltage sensor attachment terminal 163 is connected to a voltage sensor and used to detect the voltage between terminals.

The total plus terminal bus bar 164 connects to the positive electrode terminal 152 that connects to the fusible link 240, and the total minus terminal bus bar 165 connects to the negative electrode terminal 153 that connects to the GND terminal 270. The total plus terminal bus bar 164 and total minus terminal bus bar 165 are, for example, made of a conductive metal such as aluminum. The total plus terminal bus bar 164 and total minus terminal bus bar 165 each have one terminal connector 162 and an external connector 166 for connecting respectively to the total plus copper bus bar 285 and total minus copper bus bar 286 provided in the auxiliary pedestal 200. The external connector 166 has a convex shape, projecting further towards the top side than the terminal connector 162, so as to clamp the inner surface and outer surface of the outer frame 121. In particular, as illustrated in FIG. 16, the external connector 166 is attached along a bus bar support 123c formed to extend from the inner surface to the outer surface of the outer frame 121. The external connector 166 has screw holes 166a at positions corresponding to the screw holes 123b when the external connector 166 is attached to the outer frame 121. The terminal connector 162 of the total plus terminal bus bar 164 and the total minus terminal bus bar 165 also has a voltage sensor attachment terminal 163 that projects towards the opening 124b when the terminal connector 162 is attached to the cell holder 120.

The holding lid 122 includes beads 125 between bus bars that are attached to the cell holder 120, i.e. between inter-cell bus bars 160 and between an inter-cell bus bar 160 and the total plus terminal bus bar 164 or the total minus terminal bus bar 165, to prevent electrical connection between the bus bars and to position the bus bars. The beads 125 project toward the top side of the holding lid 122.

The holding lid 122 also includes screw hole forming portions 126 for fixing the LBC 140 to the top side. The screw hole forming portions 126 are formed between the openings 124a and the openings 124b on the top side of the holding lid 122. In other words, in the present embodiment, the holding lid 122 includes ten screw hole forming portions 126. Each screw hole forming portion 126 is substantially cylindrical, and a screw hole 126a is provided at the center thereof. The LBC 140 is mounted on the top side of the cell holder 120 and is screwed to the cell holder 120 from the top side using the screw holes 126a formed in the screw hole forming portions 126.

The holding lid 122 includes ribs 127, on the bottom side, to prevent misalignment of the battery cells 150 housed in the lower case 110. Four ribs 127 are provided at equal intervals in parallel to the sides 121b and 121d. In other words, the ribs 127 of the holding lid 122 are provided in a direction and at positions corresponding to the guides 116 of the lower case 110 when the cell holder 120 and the lower case 110 are engaged.

The outer frame 121 has an engaging insertion portion 121e with a predetermined height around the entire periphery. The engaging insertion portion 121e is thinner than other locations of the outer frame 121. Therefore, at the outer surface of the outer frame 121, the engaging insertion portion 121e is recessed more than other locations of the outer frame 121. As illustrated in FIG. 11B, the engaging insertion portion 121e is inserted inside the lower case 110 at the opening 113 side of the lower case 110 when the cell holder 120 is engaged with the lower case 110.

On each of the sides 121a, 121b, 121c, and 121d, the engaging insertion portion 121e includes three engaging claws 128 located at the center and near the edges. The engaging claws 128 are provided at positions corresponding to the engaging holes 115 of the lower case 110. To engage the cell holder 120 with the lower case 110, the engaging claws 128 of the cell holder 120 are fit into and engaged with the engaging holes 115 of the lower case 110, thereby engaging the cell holder 120 with the lower case 110. The position and number of engaging holes 115 and engaging claws 128 are not limited to the example illustrated in the present embodiment and may be determined as appropriate.

The outer frame 121 includes engaging holes 129a on the top side of the sides 121a and 121c near the screw holes 123b. The engaging holes 129a are provided to project to the outside from the outer frame 121 and are substantially rectangular holes in a top view. The engaging holes 129a are used when the cell holder 120 and the auxiliary pedestal 200 are attached.

The outer frame 121 includes an engaging hole 129b at the top side near the center of each side 121a, 121b, 121c, and 121d. The engaging holes 129b are provided to project to the outside from the outer frame 121 and are substantially rectangular holes in a top view. The engaging holes 129b are used when attaching the cell holder 120 and the upper case. The engaging holes 129b need not be provided near the center of the sides 121a, 121b, 121c, and 121d and may be provided at any position that allows engagement with the below-described upper case.

Here, assembly of the battery module group B is described. First, adhesive is applied to the battery cells 150. Any adhesive that can adhere the battery cells 150 to the lower case 110 and the cell holder 120 may be used, such as an epoxy adhesive. Since it suffices for the position of the battery cells 150 to be fixed in the lower case 110 when the cell holder 120 is engaged with the lower case 110, the adhesive need not be applied on the entire battery cell 150 and may instead be applied on a portion of the battery cell 150. For example, the adhesive may be applied to the battery cell 150 on the surface that comes into contact with the bottom 111 when the battery cell 150 is inserted in the lower case 110 (i.e. the opposite side from the cap surface 151) and the surface that comes into contact with the holding lid 122 when the battery cell 150 is held by the cell holder 120 from the top side (i.e. the cap surface 151). In particular, the cap surface 151 includes the positive electrode terminal 152, the negative electrode terminal 153, and the safety valve 154. Therefore, to avoid application of adhesive on the positive electrode terminal 152, the negative electrode terminal 153, and the safety valve 154, the adhesive may, for example, be applied only at the periphery in the longitudinal direction of the cap surface 151.

FIG. 10 schematically illustrates the adhesion positions, in the battery cell 150, when adhesive is applied to the surface that comes into contact with the bottom 111 when the battery cell 150 is inserted in the lower case 110 and the surface that comes into contact with the holding lid 122 when the battery cell 150 is held by the cell holder 120 from the top side (i.e. the cap surface 151). FIG. 10 is a cross-section along the A-A line in FIG. 8. Among the five stacked battery cells 150, FIG. 10 only particularly illustrates the battery cell 150 at the center and the surrounding area. In FIG. 10, the region to which adhesive is applied is indicated with shading. In this case, as illustrated in FIG. 10, the battery cell 150 is adhered to the cell holder 120 in the area surrounding the intersection between the holding lid 122 and the ribs 127 and is adhered to the lower case 110 at the bottom 111.

The material applied between the battery cells 150 and the bottom 111 of the lower case 110 is not limited to adhesive. Another filler may be applied between the battery cells 150 and the bottom 111. The filler preferably has elasticity in particular. By applying filler with elasticity between the battery cells 150 and the bottom 111, vibration occurring during running of the vehicle provided with the assembled battery 100 is absorbed by the filler. Therefore, vibration is not easily transmitted to the battery cells 150.

Next, with the cell holder 120 turned upside down, the cap surface 151 of the battery cells 150 is pointed downwards, and the battery cells 150 are inserted in accordance with the ribs 127 at the bottom side of the holding lid 122 of the cell holder 120. With the lower case 110 upside down, the lower case 110 is then engaged with the cell holder 120 so as to cover the cell holder 120 in which the battery cells 150 were inserted. As illustrated in FIG. 11A and FIG. 11B, the engaging claws 128 of the cell holder 120 are engaged with the engaging holes 115 of the lower case 110. FIG. 8 illustrates an example of the cell holder 120 and the lower case 110 in an engaged state.

The procedure for adhering the battery cells 150 is not limited to the aforementioned procedure. For example, without turning the lower case 110 and the cell holder 120 upside down, the battery cells 150 may be inserted in the space 110a of the lower case 110, and the cell holder 120 may be engaged with the lower case 110 from above.

The inter-cell bus bars 160, the total plus terminal bus bar 164, and the total minus terminal bus bar 165 are then attached by bead welding to the terminals of the battery cells 150 exposed through the openings 124a of the holding lid 122, and the LBC 140 is attached to the holding lid 122, thereby completing assembly of the battery module group B. As described above, the LBC 140 is attached to the holding lid 122 by screwing, for example.

Next, the auxiliary module group S of the assembled battery 100 according to the present embodiment is described. The auxiliary module group S is configured by attaching together the auxiliary pedestal 200, the MOSFET 210, relay 220, current sensor 230, and fusible link 240 disposed on the auxiliary pedestal 200, and copper bus bars for electrically connecting the components disposed on the auxiliary pedestal 200.

The auxiliary pedestal 200 has four sides 200a, 200b, 200c, and 200d, and a mounting surface 201. The four sides 200a, 200b, 200c, and 200d are disposed at positions corresponding to the four sides 112a, 112b, 112c, and 112d of the lower case 110 (and the four sides 121a, 121b, 121c, and 121d of the cell holder 120) when the auxiliary pedestal 200 is attached to the battery module group B.

The current sensor 230 near the side 200a, the MOSFET 210 near the side 200b, the relay 220 near the side 200c, and the fusible link 240 near the side 200d are mounted on the mounting surface 201. As illustrated in FIG. 12, the mounting surface 201 is uneven in accordance with the positions at which the MOSFET 210, relay 220, current sensor 230, and fusible link 240 are mounted. By being uneven, the mounting surface 201 is more rigid than a flat mounting surface.

In the present embodiment, the mounting surface 201 is formed to have an unevenness such that a region 201c where the relay 220 is mounted on the mounting surface 201 is at a higher position when the assembled battery 100 is assembled than a region 201a where the current sensor 230 is mounted, a region 201b where the MOSFET 210 is mounted, and a region 201d where the fusible link 240 is mounted, as illustrated in FIG. 12. The unevenness of the mounting surface 201 is such that the region 201d where the fusible link 240 is mounted is at a higher position when the assembled battery 100 is assembled than the region 201a and the region 201b. In other words, the unevenness of the mounting surface 201 is such that the region 201a where the current sensor 230 is mounted is at a lower position than the region 201c and the region 201d. By the mounting surface 201 having such an unevenness, the fusible link 240 can be disposed at a lower position than the relay 220 on the auxiliary pedestal 200, and the current sensor 230, which is thicker than the fusible link 240, can also be disposed at a lower position than the relay 220.

The current sensor 230, MOSFET 210, relay 220, and fusible link 240 are positioned in the respective regions 201a, 201b, 201c, and 201d by standing walls formed by the unevenness of the mounting surface 201 or by ribs 202 formed on the mounting surface 201.

In the present embodiment, the region 201c is partially surrounded by the ribs 202, as illustrated in FIG. 12 and FIG. 14, for example. In other words, the relay 220 is positioned by the ribs 202. The ribs 202 also have a rotation-stopping function when the relay 220 is fixed to the auxiliary pedestal 200 with nuts 290. The ribs 202 also have an insulating function to prevent contact between the below-described copper bus bars.

The MOSFET 210, relay 220, and fusible link 240 are positioned by standing walls formed to partially surround the respective regions 201a, 201b, and 201d. The standing walls on the mounting surface 201 also have a rotation-stopping function when the MOSFET 210, the relay 220, and the fusible link 240 are fixed to the auxiliary pedestal 200 with nuts 290.

The auxiliary pedestal 200 includes a plurality of upward-facing studs 203 on the mounting surface 201. The studs 203 are used to connect the battery cells 150 of the battery module group B, the MOSFET 210, the relay 220, the current sensor 230, and the fusible link 240 electrically to each other. The SSG terminal 250, the LOAD terminal 260, and the GND terminal 270 also extend upward from the mounting surface 201 and function as studs.

Each stud 203, the SSG terminal 250, the LOAD terminal 260, and the GND terminal 270 are provided at appropriate heights on the uneven mounting surface 201. For example, the studs 203 are provided at a height corresponding to the terminals of the current sensor 230, the MOSFET 210, the relay 220, and the fusible link 240 respectively mounted in the regions 201a, 201b, 201c, and 201d on the mounting surface 201. Each stud 203 has a diameter corresponding in size to an opening for connection provided in the terminals of the current sensor 230, the MOSFET 210, the relay 220, and the fusible link 240. The current sensor 230, the MOSFET 210, the relay 220, and the fusible link 240 are attached to the auxiliary pedestal 200 by passing the studs 203 through the openings for connection of the terminals from the top side. Providing the studs 203 to face upward in this way facilitates attachment of the components to the auxiliary pedestal 200, thereby improving the productivity of the auxiliary module and the assembled battery 100.

Furthermore, in the present embodiment, the GND terminal 270 is provided at a lower position than the SSG terminal 250 and the LOAD terminal 260. Setting the GND terminal 270 to differ in height from the SSG terminal 250 and the LOAD terminal 260 in this way increases the distinguishability of the GND terminal 270, thereby facilitating prevention of miswiring when mounting the assembled battery 100 in a vehicle.

Here, the wiring of components using copper bus bars on the auxiliary pedestal 200 is described. As illustrated in FIG. 14 and FIG. 15, the copper bus bars 280 through 284 have various shapes in accordance with their position so as to follow the unevenness of the mounting surface 201 of the auxiliary pedestal 200.

A terminal 240b of the fusible link 240 connects electrically to a terminal 230a of the current sensor 230 via the copper bus bar 280. The other terminal 230b of the current sensor 230 connects electrically to a terminal 220a of the relay 220 via the copper bus bar 281. The other terminal 220b of the relay 220 connects electrically to a terminal 210a of the MOSFET 210 via the copper bus bar 282. The terminal 220b of the relay 220 further connects electrically to the SSG terminal 250 via the copper bus bars 282 and 283. The other terminal 210b of the MOSFET 210 connects electrically to the LOAD terminal 260 via the copper bus bar 284.

The total plus copper bus bar 285 for electrically connecting to the total plus terminal bus bar 164 of the battery module group B connects to a terminal 240a of the fusible link 240. The total minus copper bus bar 286 for electrically connecting to the total minus terminal bus bar 165 of the battery module group B connects to the GND terminal 270. The total plus copper bus bar 285 and the total minus copper bus bar 286 extend respectively along the bottom side of the sides 200b and 200d, and the tips thereof respectively come in contact with the total plus terminal bus bar 164 and the total minus terminal bus bar 165 when the auxiliary pedestal 200 and the cell holder 120 are attached, thereby ensuring electrical connection. The total plus copper bus bar 285 and the total minus copper bus bar 286 have, at the tips thereof, respective screw holes 285a and 286a at positions corresponding to the screw holes 123b provided on the cell holder 120 when the auxiliary pedestal 200 and the cell holder 120 are attached.

The copper bus bars 280 through 284 and the total plus copper bus bar 285 are secured to the auxiliary pedestal 200 along with the MOSFET 210, relay 220, current sensor 230, and fusible link 240 by the nuts 290, which are screwed onto the studs 203 from the top side. The relay 220 has openings 221 at different positions from the terminal 220a and the terminal 220b and is also secured to the auxiliary pedestal 200 by the openings 221 being placed onto the studs 203 and the nuts 290 being screwed to the studs 203 from the top side.

As described above, the ribs 202 provided on the auxiliary pedestal 200 prevent the copper bus bars from being in contact. Furthermore, dividing walls 222 provided at the terminal 220a and the terminal 220b of the relay 220 also have an insulating function to prevent contact between the copper bus bars.

The auxiliary pedestal 200 includes screw hole forming portions 204, at the edges of the sides 200b and 200d, that have a screw hole 204a for fixing the cell holder 120 and the auxiliary pedestal 200 by screwing. The screw hole 204a is provided at a position corresponding to the screw hole 123a provided on the cell holder 120 when the cell holder 120 and the auxiliary pedestal 200 are attached.

The auxiliary pedestal 200 includes engaging claws 205 on the side 200a near the stud 203 to which the total plus copper bus bar 285 is attached and on the side 200c near the GND terminal 270 to which the total minus copper bus bar 286 is attached. The engaging claws 205 are provided at positions corresponding to the engaging holes 129a when the cell holder 120 and the auxiliary pedestal 200 are attached. The engaging claws 205 extend towards the bottom from the exterior of the sides 200a and 200c, and the tips of the engaging claws 205 are wedge-shaped in a side view. The engaging claws 205 engage with the engaging holes 129a by the tips of the engaging claws 205 being fit into the engaging holes 129a.

Here, assembly of the auxiliary module group S is described. During assembly of the auxiliary module group S, the components (i.e. the MOSFET 210, relay 220, current sensor 230, and fusible link 240) and the copper bus bars (i.e. the copper bus bars 280 through 284, the total plus copper bus bar 285, and the total minus copper bus bar 286) are placed onto the studs 203, the SSG terminal 250, the LOAD terminal 260, and the GND terminal 270 of the mounting surface 201 of the auxiliary pedestal 200. The auxiliary module group S is then assembled by the nuts 290 being screwed onto the studs 203, the SSG terminal 250, the LOAD terminal 260, and the GND terminal 270 from the top side.

Next, the upper case is described. As illustrated in FIG. 16, the upper case 300 has three openings 310a, 310b, and 310c for exposing the SSG terminal 250, the LOAD terminal 260, and the GND terminal 270 to the outside from the upper case 300 when the assembled battery 100 is assembled.

The upper case 300 also includes engaging claws 320 for engaging with the cell holder 120 at the bottom of the four sides. The engaging claws 320 are provided at positions corresponding to the engaging holes 129b when the cell holder 120 and the upper case 300 are attached together. The engaging claws 320 extend towards the bottom from the exterior of the sides, and the tips of the engaging claws 320 are wedge-shaped in a side view. The engaging claws 320 engage with the engaging holes 129b by the tips of the engaging claws 320 being fit into the engaging holes 129b.

The upper case 300 includes bus bar protectors 330 for protecting the total plus copper bus bar 285 and the total minus copper bus bar 286 when the cell holder 120 and the upper case 300 are attached together.

Next, assembly of the entire assembled battery 100 is described. First, attachment of the battery module group B and the auxiliary module group S is described. The battery module group B and the auxiliary module group S are attached together by attaching the cell holder 120 to the auxiliary pedestal 200. Bus bars, bolts, and the like are used for this attachment.

As illustrated in FIG. 17, the cell holder 120 and auxiliary pedestal 200 are attached together by the engaging claws 205 being fit into and engaged with the engagement holes 129a. The engaging claws 205 are provided on the auxiliary pedestal 200, and the engagement holes 129a are provided on the cell holder 120, thus achieving robust attachment without increasing the number of components. The cell holder 120 and the auxiliary pedestal 200 are attached together by the auxiliary pedestal 200 being placed on the cell holder 120 and bolts 340 being screwed from outside the sides 200b and 200d into the screw holes 123b, illustrated in FIG. 8, through the screw hole 285a or the screw hole 286b and the screw holes 166a. In other words, as illustrated in FIG. 17, the cell holder 120 and auxiliary pedestal 200 are attached together indirectly by the bolts 340 through two bus bars (the total minus copper bus bar 286 and the total minus terminal bus bar 165) at the corner C1 of the auxiliary pedestal 200. The cell holder 120 and auxiliary pedestal 200 are also attached together indirectly by the bolts 340 through two bus bars (the total plus copper bus bar 285 and the total plus terminal bus bar 164) at the corner C2 opposite the corner C1. In other words, the bus bars that fasten the auxiliary pedestal 200 to the cell holder 120 are attached at any opposing corners (C1 and C2 in the present embodiment) of the auxiliary pedestal 200. Since the bus bars for fastening are required to begin with for electrical connection, robust attachment can be achieved without increasing the number of components. At this time, supports 206 provided along the total plus copper bus bar 285 and the total minus copper bus bar 286 have a rotation-stopping function, thus preventing the attachment between the auxiliary pedestal 200 and the cell holder 120 from weakening.

Combining attachment by engagement and attachment with the bolts 340 achieves more robust attachment than use of only one form of attachment.

Furthermore, the cell holder 120 and the auxiliary pedestal 200 are attached together by the cell holder 120 being placed on the auxiliary pedestal 200 and bolts 350 then being screwed from the top side into the screw holes 123a through the screw holes 204a, provided on the opposing corners C3 and C4 of the auxiliary pedestal 200 (different opposing corners C3 and C4 from the opposing corners C1 and C2), as illustrated in FIG. 17. In other words, the auxiliary pedestal 200 and the cell holder 120 are attached together at four corners (C1 through C4), making the attachment more robust. The bolts 350 in the present embodiment are, for example, M6 (6 mm diameter).

The battery module group B and the auxiliary module group S of the present embodiment are attached together in the above-described way, thereby fixing the battery module group B and the auxiliary module group S at the four corners of the auxiliary pedestal 200, which is substantially rectangular in a top view. This structure achieves robust attachment.

Next, attachment of the upper case 300 is described. The upper case 300 is engaged with the cell holder 120 by the engaging claws 320 being fit into and engaged with the engagement holes 129b of the cell holder 120. By the upper case 300 thus being engaged with the cell holder 120, assembly of the entire assembled battery 100 is complete.

In this way, the cell holder 120 and the auxiliary pedestal 200 are first assembled and then attached together in the manufacturing method of the assembled battery 100 according to an embodiment of the present disclosure. The battery module group B and the auxiliary module group S can be assembled in parallel, allowing the assembly takt time to be shortened and improving productivity of the assembled battery 100. Furthermore, as compared to when the entire assembled battery 100 is assembled in sequence, components are discarded less frequently due to backtracking when problems occur during attachment.

In the assembled battery 100 according to an embodiment of the present disclosure, the battery module group B and the auxiliary module group S are attached together by the auxiliary pedestal 200 being fastened to the cell holder 120 by bus bars (total plus copper bus bar 285, total plus terminal bus bar 164, total minus copper bus bar 286, and total minus terminal bus bar 165). Since these bus bars are required to begin with for electrical connection between the battery module group B and the auxiliary module group S, robust attachment can be achieved without increasing the number of components.

The assembled battery 100 according to an embodiment of the present disclosure achieves attachment by the engaging claws 205 of the auxiliary pedestal 200 engaging with the engaging holes 129*a* of the cell holder 120. The engaging claws 205 are provided on the auxiliary pedestal 200, and the engagement holes 129*a* are provided on the cell holder 120, thus achieving robust attachment without further increasing the number of components.

In the assembled battery 100 according to an embodiment of the present disclosure, bus bars are fastened by connecting the bus bars attached to the auxiliary pedestal 200 (total plus copper bus bar 285 and total minus copper bus bar 286) and the bus bars attached to the cell holder 120 (total plus terminal bus bar 164 and total minus terminal bus bar 165). In other words, the bus bars for electrically connecting the auxiliary pedestal 200 and the cell holder 120 are directly connected, allowing an increase in the number of components to be reduced.

In the assembled battery 100 according to an embodiment of the present disclosure, the auxiliary pedestal 200 further includes the supports 206 along the bus bars attached to the auxiliary pedestal 200 (total plus copper bus bar 285 and total minus copper bus bar 286). Attachment between the auxiliary pedestal 200 and the cell holder 120 can therefore be prevented from weakening due to rotation of the bus bars. Furthermore, screwing of the bus bars is not blocked by rotation of the bus bars.

In the assembled battery 100 according to an embodiment of the present disclosure, the bus bars that fasten the auxiliary pedestal 200 to the cell holder 120 (total plus copper bus bar 285, total plus terminal bus bar 164, total minus copper bus bar 286, and total minus terminal bus bar 165) are attached at any opposing corners (C1 and C2) of the auxiliary pedestal 200. The auxiliary pedestal 200 and cell holder 120 are moreover attached together by bolts 350 at different opposing corners (C3 and C4) from the above opposing corners. In other words, the auxiliary pedestal 200 and the cell holder 120 can be attached together at four corners (C1 through C4), making the attachment more robust.

REFERENCE SIGNS LIST

B Battery module group
S Auxiliary module group
100 Assembled battery
110 Lower case
110*a* Space
111 Bottom
112, 112*a*, 112*b*, 112*c*, 112*d*, 121*a*, 121*b*, 121*c*, 121*d*, 200*a*, 200*b*, 200*c*, 200*d* Side
113, 124*a*, 124*b*, 221, 310*a*, 310*b*, 310*c* Opening
114 Attachment mechanism
115, 129*a*, 129*b* Engaging hole
116 Guide
120 Cell holder
121 Outer frame
121*e* Engaging insertion portion
122 Holding lid
122*a* Frame portion
123, 126, 204 Screw hole forming portion
123*a*, 123*b*, 126*a*, 163*a*, 166*a*, 204*a*, 285*a*, 286*a* Screw hole
123*c* Bus bar support
125 Bead
127, 202 Rib
128, 205, 320 Engaging claw
130 First secondary battery
140 LBC (battery controller)
150 Battery cell
151 Cap surface
152, 210*a*, 220*a*, 230*a*, 240*a* Terminal
153, 210*b*, 220*b*, 230*b*, 240*b* Terminal
154 Safety valve
160 Inter-cell bus bar
161 Convex portion
162 Terminal connector
162*a* Opening for welding
163 Voltage sensor attachment terminal
164 Total plus terminal bus bar
165 Total minus terminal bus bar
166 External connector
200 Auxiliary pedestal
201 Mounting surface
201*a*, 201*b*, 201*c*, 201*d* Region
203 Stud
206 Support
210 MOSFET
220 Relay
222 Dividing wall
230 Current sensor
240 Fusible link
250 SSG terminal
260 LOAD terminal
270 GND terminal
280, 281, 282, 283, 284 Copper bus bar
285 Total plus copper bus bar
286 Total minus copper bus bar
290 Nut
300 Upper case
330 Bus bar protector
340, 350 Bolt
400 Power supply system
410 Alternator
420 Starter
430 Second secondary battery
440 Load
450 Switch
460 Controller
C1, C2, C3, C4 Corner

The invention claimed is:
1. An assembled battery comprising:
 a battery module group comprising one or more battery cells and a cell holder configured to hold the one or more battery cells, the one or more battery cells each having terminals and the cell holder having an outer frame;

an auxiliary module group comprising a plurality of components and a pedestal on which the plurality of components is arranged;

a first bus bar having one end attached to one of the terminals of the one or more battery cells and an other end attached to the outer frame of the cell holder; and a second bus bar attached to the pedestal, wherein the first bus bar, the second bus bar, and the outer frame of the cell holder are fastened together, so that the battery module group and the auxiliary module group are attached together.

2. The assembled battery of claim 1, wherein the battery module group and the auxiliary module group are further attached together by an engaging claw of the pedestal engaging with an engaging hole of the cell holder.

3. The assembled battery of claim 2, wherein the pedestal further comprises a support along the second bus bar.

4. The assembled battery of claim 2, wherein the assembled battery comprises two pairs of the first and second bus bars;

the pairs of the first and second bus bars are attached at any opposing corners of the pedestal; and the pedestal and the cell holder are further attached by bolts at different opposing corners from the any opposing corners.

5. The assembled battery of claim 1, wherein the pedestal further comprises a support along the second bus bar.

6. The assembled battery of claim 1, wherein the assembled battery comprises two pairs of the first and second bus bars;

the pairs of the first and second bus bars are attached at any opposing corners of the pedestal; and the pedestal and the cell holder are further attached by bolts at different opposing corners from the any opposing corners.

7. The assembled battery of claim 1, wherein the pedestal is fastened to the cell holder by directly fastening together the second bus bar directly with the first bus bar.

8. An assembled battery comprising:

a battery module group comprising one or more battery cells and a cell holder configured to hold the one or more battery cells; and an auxiliary module group comprising a plurality of components and a pedestal on which the plurality of components is arranged; wherein the battery module group and the auxiliary module group are attached together by the pedestal being fastened to the cell holder with bus bars;

the pedestal is fastened to the cell holder by fastening together a bus bar attached to the pedestal with a bus bar attached to the cell holder;

bus bars fastening the pedestal to the cell holder are attached at any opposing corners of the pedestal; and the pedestal and the cell holder are further attached by bolts at different opposing corners from the any opposing corners.

9. An assembled battery comprising:

a battery module group comprising one or more battery cells and a cell holder configured to hold the one or more battery cells; and an auxiliary module group comprising a plurality of components and a pedestal on which the plurality of components is arranged; wherein the battery module group and the auxiliary module group are attached together by the pedestal being fastened to the cell holder with bus bars;

the pedestal is fastened to the cell holder by fastening together a bus bar attached to the pedestal with a bus bar attached to the cell holder;

the battery module group and the auxiliary module group are further attached together by an engaging claw of the pedestal engaging with an engaging hole of the cell holder;

bus bars fastening the pedestal to the cell holder are attached at any opposing corners of the pedestal; and the pedestal and the cell holder are further attached by bolts at different opposing corners from the any opposing corners.

* * * * *